United States Patent [19]
Imai et al.

[11] Patent Number: 5,902,541
[45] Date of Patent: May 11, 1999

[54] INJECTION MOLDING METHOD FOR PRODUCING SHAPED, HOLLOW RESIN ARTICLES, AND MOLD FOR USE THEREIN

[75] Inventors: Shoji Imai, Tokyo; Maki Horikoshi, Kawasaki, both of Japan

[73] Assignee: Asahi Kasei Kogyo Kabushiki Kaisha, Osaka, Japan

[21] Appl. No.: 08/793,774

[22] PCT Filed: Feb. 10, 1995

[86] PCT No.: PCT/JP95/00190

§ 371 Date: Mar. 12, 1997

§ 102(e) Date: Mar. 12, 1997

[87] PCT Pub. No.: WO96/16783

PCT Pub. Date: Jun. 6, 1996

[30] Foreign Application Priority Data

Nov. 25, 1994 [JP] Japan ..................................... 6-314370

[51] Int. Cl.⁶ ............................. B29D 22/00; B29D 7/00; B22D 15/00; A23P 1/00
[52] U.S. Cl. ............... 264/572; 264/328.12; 264/328.16; 249/111; 425/130; 425/547
[58] Field of Search .......................... 428/35.7; 425/526, 425/130, 542, 547, 549, 533; 266/572, 328.16, 328.12, 523, 537; 269/111

[56] References Cited

FOREIGN PATENT DOCUMENTS

| | | |
|---|---|---|
| 4-37511 | 2/1992 | Japan . |
| 4-62125 | 2/1992 | Japan . |
| 5-138678 | 6/1993 | Japan . |
| 5-245881 | 9/1993 | Japan . |
| 6364927 | 5/1994 | Japan . |
| 6-155506 | 6/1994 | Japan . |
| 8-25397 | 1/1996 | Japan . |

OTHER PUBLICATIONS

Patent Abstracts of Japan, vol. 15, No. 253 (M–1263), (Jun. 9, 1992) and JP 04 062125A (Isuzu Motors Ltd), (Feb. 27, 1992).

Patent Abstracts of Japan, vol. 95, No. 8, (Sep. 29, 1995) and JP 07 112460A (Asahi Chem Ind Co Ltd), (May 2, 1995).
Patent Abstracts of Japan, vol. 95, No. 5 (Jun. 30, 1995) and JP 07 052183A (Asahi Chem Ind. Co Ltd), (Feb. 28, 1995).
Patent Abstracts of Japan, vol. 95, No. 6 (Jul. 31, 1995) and JP 07 080883A (Asahi Chem Ind Co Ltd), (Mar. 28, 1995).
Patent Abstracts of Japan, vol. 18, No. 650 (M–1719), (Dec. 9, 1994) and JP 06 254912A (Asahi Chem Ind Co Ltd), (Sep. 13, 1994).

*Primary Examiner*—James C. Housel
*Assistant Examiner*—S. Devi
*Attorney, Agent, or Firm*—Birch, Stewart, Kolasch & Birch, LLP

[57] ABSTRACT

Disclosed is an injection molding method for producing a shaped, hollow resin article by introducing a pressurized fluid into a molten resin mass injected into a mold cavity, wherein, during the introduction of the pressurized fluid, the temperature of at least one preselected portion of a back surface of the molten resin mass is maintained at a level which is at least 5° C. higher than the temperature of a front surface of the molten resin mass, causing the fluid to flow into the molten resin mass along a line substantially corresponding to a line along which the preselected portion of the back surface extends, so that a shaped, hollow resin article produced has a hollow in a position corresponding to the preselected portion of the back surface. By the method of the present invention, the flow of the pressurized fluid introduced can be surely led to an intended portion in the molten resin mass, so that the location of a hollow in the molten resin mass can be surely controlled. According to one preferred embodiment of the present invention, the shaped, hollow resin article produced has a thickness of at least 1.0 mm as measured at a portion having a hollow therein. According to another preferred embodiment of the present invention, the shaped, hollow resin article produced has a thickness of 3.5 mm or less as measured at a portion having a hollow therein. In each of the preferred embodiments, a shaped, hollow resin article having a front surface thereof which is in a uniform, smooth surface condition can be obtained. Also disclosed is a mold for use in the method.

6 Claims, 5 Drawing Sheets

5,902,541

INJECTION MOLDING METHOD FOR PRODUCING SHAPED, HOLLOW RESIN ARTICLES, AND MOLD FOR USE THEREIN

The instant application has been filed as a 371 of PCT application PCT/JP95/00190 filed Feb. 10, 1995 with a priority claim to national application 6/314370 filed Nov. 25, 1994 in Japan.

BACKGROUND OF THE INVENTION

1. Field of the Invention

The present invention relates to an improved method for producing a shaped, hollow resin article. More particularly, the present invention is concerned with an injection molding method for producing a shaped, hollow resin article by injecting a resin in a molten form into a mold cavity to form a molten resin mass, and introducing a pressurized fluid into the molten resin mass, wherein, during the introduction of the pressurized fluid into the molten resin mass, the temperature of at least one preselected portion of a back surface of the molten resin mass is maintained at a level which is higher by a specific temperature difference than the temperature of a front surface of the molten resin mass, causing the fluid to flow into the molten resin mass along a line substantially corresponding to a line along which the preselected portion of the back surface extends, so that the shaped, hollow resin article produced has a hollow in a position corresponding to the preselected portion of the back surface. By the method of the present invention, the flow of the pressurized fluid introduced can be surely led to an intended portion in a molten resin mass, so that the location of a hollow in the molten resin mass can be surely controlled and, therefore, a shaped, hollow resin article having a hollow of an orderly morphology can be produced. The present invention is also concerned with a mold for use in the method.

2. Discussion of Related Art

Conventionally, for the purpose of not only preventing the occurrence of sink marks of a resin on a local thick-walled section but also producing a light weight shaped resin article, there have been employed various injection molding methods (so-called gas injection molding methods) for producing a shaped, hollow resin article by injecting a resin in a molten form into a mold cavity to form a molten resin mass, and introducing a pressurized fluid into the molten resin mass (the so-called "gas injection molding methods" include not only a method in which a gas is used as the pressurized fluid but also a method in which a liquid is used as the pressurized fluid). In the field of gas injection molding, for leading the flow of the pressurized fluid to an intended portion in a molten resin mass so as to control the location of a hollow to be formed in the molten resin mass, the following methods and molds suitable therefor have conventionally been proposed.

(1) A method in which a molten resin mass having continuous thick-walled sections of rib structures connected to a gate for introducing a pressurized gas is formed, and a pressurized gas is introduced into the thick-walled sections, and a mold suitable therefor (see Unexamined Japanese Patent Application Laid-Open Specification No. 63-268611, which corresponds to U.S. Pat. No. 4,923,666).

(2) A method in which use is made of a mold provided, at a portion thereof corresponding to a thick-walled section of a shaped resin article to be produced, with a heat insulating member or heater which is capable of lowering the cooling rate of the molten resin at the thick-walled section as compared to the cooling rate of the molten resin at portions other than the thick-walled section (see Unexamined Japanese Patent Application Laid-Open Specification No. 4-62125).

(3) A method in which use is made of a mold, the overall inner wall surface (defining a mold cavity) of which is coated with a heat resisting, heat insulating resin film in a thickness of 0.001 to 2 mm (see Unexamined Japanese Patent Application Laid-Open Specification No. 5-245881). The specification describes that this method renders it possible to solve problems, such as poor reproduction of the profile of the mold inner surface on a resultant molded product and occurrence of a hesitation mark, which are likely to be caused in forming a hollow in a thick-walled section of the resultant molded product.

(4) A method in which a molten resin mass having a continuous thick-walled section of rib structure connected to a gate for introducing a pressurized gas is formed, and a pressurized gas is introduced into the thick-walled section, and in which use is made of a mold having a heat insulating member at a portion of the mold which corresponds to the above-mentioned thick-walled section, wherein the overall inner wall surface of the mold is coated with a heat insulating film (see Unexamined Japanese Utility Model Application Laid-Open Specification No. 6-34927).

(5) A method in which use is made of a nozzle (for injecting the molten resin mass) having a heater embedded in an inner wall of the nozzle longitudinally thereof so as to cause a temperature difference in the inner wall of the nozzle, and a molten resin is injected into a mold cavity through the nozzle to thereby cause a temperature difference in the injected molten resin mass, and a pressurized gas is introduced into the molten resin mass at a high temperature region thereof. This method utilizes the fact that the viscosity of the high temperature region of the molten resin mass is less than the viscosity of the low temperature region of the molten resin mass, so that the resistance to the flow of the pressurized gas in the high temperature region of the molten resin mass is lower than in the low temperature region. Also disclosed are a method and a mold suitable therefor in which a mold inner surface defining a mold cavity is radially divided into a plurality of sections taking a sprue as a center of the radiation, and heating sections and cooling sections are alternately disposed to cause a temperature difference between adjacent sections (corresponding to the adjacent sections of the mold inner surface) of an injected molten resin mass, so that a pressurized gas can be led to high temperature sections of the molten resin mass in which the viscosity of the molten resin mass is low and therefore the flow resistance to the pressurized gas is low. (see Examined Japanese Patent Application Publication Specification No. 61-53208).

The basic concept of each of the above-mentioned conventional methods resides in that the temperature of a preselected local portion of the molten resin mass in which portion a hollow is to be formed is maintained at a level which is higher than the temperature of a portion surrounding the local portion, to thereby render the preselected local portion relatively low in flow resistance, so that a pressurized fluid can be led into the preselected local portion having a relatively low flow resistance. In order to achieve such a temperature difference in a molten resin mass, a thick-walled section is formed in the molten resin mass in methods (1), (2), (3) and (4) above and, in method (5), differing from those methods, a temperature difference in the molten resin mass is generated by specifically designing the inner wall of the nozzle for injecting a molten resin or the mold inner surface defining the mold cavity.

However, the above conventional methods have the following disadvantages.

In the methods (1), (2), (3) and (4) above, it is necessary to form a thick-walled section in the molten resin mass for leading a pressurized gas thereinto, which necessarily restricts the design of a shaped resin article. Further, in the methods (1) and (2), due to the difference in thickness of the resin by forming a portion (i.e., thick-walled section) at which a volume contraction is large, the surface appearance of the resultant shaped resin article at a portion corresponding to the thick-walled section becomes poor, so that finishing of the article, such as coating, becomes necessary. Furthermore, in the methods (3) and (4), in order to improve the surface appearance of the resultant shaped resin article, the overall inner wall surface of the mold has a thin coating of a heat insulating material. However, such a mold is expensive and the durability of the thin coating is unsatisfactory for the mass production of shaped resin articles.

In method (5) above, depending on the shape of an intended shaped article, in some cases, it is likely that a pressurized gas cannot be surely led to an intended portion in a molten resin mass and, even if the gas is surely led to an intended portion, the surface of a local outer portion of the resultant shaped article which corresponds to the hollow portion in the shaped article is different in gloss and luster from the surface of a portion surrounding the local outer portion, so that the surface appearance of the shaped resin article produced becomes poor.

As described in detail below, the present inventors have conducted extensive and intensive studies to elucidate the reason why a non-uniformity (which is causative of a deterioration of the surface condition) occurs in the gloss and luster of a shaped, hollow resin article. As a result, the present inventors have found that the occurrence of the non-uniformity in gloss and luster is largely influenced by the thickness of the shaped, hollow resin article at its portion having a hollow therein and by a temperature difference between a front surface and a back surface of a molten resin mass at its portion in which a hollow is to be formed. Specifically, the present inventors have found that the mechanism by which a non-uniformity in the gloss and luster of a shaped, hollow resin article occurs is varied depending on the thickness of the shaped, hollow resin article at its portion having a hollow therein. As a result of further studies, the present inventors have also found that occurrence of a non-uniformity in the gloss and luster of a front surface of a shaped, hollow resin article can be prevented by regulating the temperature difference between the front and back surfaces of a molten resin mass at its portion in which a hollow is to be formed, i.e., by regulating the cooling conditions of the front and back surfaces of the molten resin mass, in accordance with the thickness of the shaped, hollow resin article at its portion having a hollow therein.

However, as described above, the above-mentioned prior art techniques only attempt to maintain a portion of the molten resin mass at which a hollow is to be formed at a temperature higher than that of other portions of the molten resin mass, and the prior art techniques have no teaching concerning the above-mentioned regulation of the temperatures of the front and back surfaces of a molten resin mass according to the thickness of the molten resin mass at its portion in which a hollow is to be formed. Further, there is no description in any of the above-mentioned Japanese patent documents (1) through (5) about producing a temperature difference between the front and back surfaces of a molten resin mass at its portion in which a hollow is to be formed.

SUMMARY OF THE INVENTION

In these situations, the present inventors have made studies for solving the above-mentioned problems of the prior art. That is, the present inventors have made extensive and intensive studies with a view toward developing a novel gas injection molding method for producing a shaped, hollow resin article which comprises introducing a pressurized fluid into a molten resin mass in a mold cavity to thereby form a hollow in the molten resin mass, wherein not only can the flow of the pressurized fluid be surely led to an intended portion in the molten resin mass to thereby surely control the location of a hollow formed in the molten resin mass, but also the surface of a local outer portion of the resultant shaped article which corresponds to the hollow portion in the shaped article can be prevented from being rendered different in gloss and luster from the surface of a portion surrounding the local outer portion, so that the front surface condition of the shaped resin article produced can be improved. As a result, it has unexpectedly been found that when, during the introduction of the pressurized fluid into the molten resin mass, the temperature of at least one preselected portion of the back surface of the molten resin mass is maintained at a level which is at least 5° C. higher than the temperature of the front surface of the molten resin mass, the pressurized fluid can be caused to flow into the molten resin mass along a line substantially corresponding to a line along which the preselected portion of the back surface extends, so that the shaped, hollow resin article has a hollow in a position corresponding to the preselected portion of the back surface. Furthermore, it has also been found that by appropriately varying the manner of regulating the temperature difference between the front and back surfaces of the molten resin mass injected into the cavity wherein the resultant shaped, hollow resin article has a thickness of at least 1.0 mm or 3.5 mm or less as measured at a portion having a hollow therein, the surface condition of the shaped, hollow resin article can be remarkably improved. The present invention has been completed, based on these novel findings.

It is, accordingly, an object of the present invention to provide a gas injection molding method for producing a shaped, hollow resin article, by which the location of a hollow to be formed in the shaped, hollow resin article can be surely controlled.

It is another object of the present invention to provide a gas injection molding method for producing a shaped, hollow resin article having a thickness of at least 1.0 mm as measured at a portion having a hollow therein, having a hollow of an orderly morphology and having a front surface thereof which is in an extremely excellent condition.

It is a further object of the present invention to provide a gas injection molding method for producing a shaped, hollow resin article having a thickness of 3.5 mm or less as measured at a portion having a hollow therein, having a hollow of an orderly morphology and having a front surface thereof which is in an extremely excellent condition.

It is still a further object of the present invention to provide the above-mentioned excellent shaped, hollow resin articles.

It is still a further object of the present invention to provide a mold which can be suitably used in the method of the present invention.

The foregoing and other objects, features and advantages will be apparent to those skilled in the art from the following detailed description and claims taken in connection with the accompanying drawings.

BRIEF DESCRIPTION OF THE DRAWINGS

In the accompanying drawings:

In FIG. 1 through FIG. 9, like parts or portions are designated by like numerals or characters. In FIG. 1 through FIG. 9, the reference numerals designate the following parts and portions.

Figure 1:
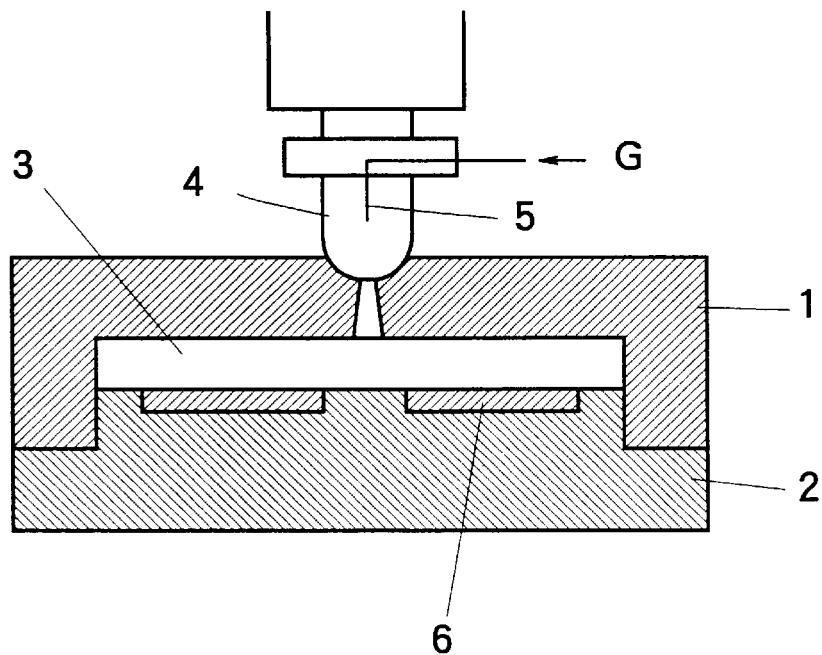
FIG. 1 is a diagrammatic, vertical cross-sectional view of one form of a mold having a heat insulating member embedded in an inner wall surface thereof, for use in one mode of the gas injection molding method according to the present invention, shown together with a molten resin injection nozzle and a pressurized fluid introduction nozzle.

1: Fixed mold half
2: Movable mold half
3: Mold cavity
4: Molten resin injection nozzle
5: Gas introduction nozzle (Pressurized fluid introduction nozzle)
6: Heat insulating member
7: Hollow
8: Heat insulating layer (Heat insulating member)
9: Surface layer (Heat conductive layer)
10: Heat conductive member
11: Plate section
12: Thick-walled section
13: Opening edge
14: Boss
15: Reinforcing rib
G: Pressurized fluid

DETAILED DESCRIPTION OF THE INVENTION

Essentially, according to the present invention, there is provided a method for injection molding a resin while forming a hollow to produce a shaped, hollow resin article, comprising:

(1) providing a mold comprising a fixed mold half and a movable mold half mating with the fixed mold half to thereby provide a cavity defined by an inner wall surface of the fixed mold half and an inner wall surface of the movable mold half, the cavity having opposite, first and second inner wall surfaces, which respectively correspond to a front surface and a back surface of a shaped, hollow resin article to be molded by the mold;

(2) injecting a resin in a molten form into the cavity through a gate for the cavity in an amount of at least 60% of a predetermined amount sufficient to fill the entire volume of the cavity, thereby forming a molten resin mass having opposite, front and back surfaces respectively facing the opposite, first and second inner wall surfaces of the cavity, (3) introducing a pressurized fluid into the molten resin mass through the gate or through an inlet for the fluid which inlet is provided independently from the gate, thereby forming a hollow in the molten resin mass, wherein the introduction of the fluid is conducted without injecting a molten resin into the cavity or while injecting a molten resin into the cavity, and (4) allowing the molten resin mass having the hollow formed therein to cool, thereby producing a shaped, hollow resin article, wherein, during the introduction of the pressurized fluid in step (3), the temperature of at least one preselected portion of the back surface of the molten resin mass is maintained at a level which is at least 5° C. higher than the temperature of the front surface of the molten resin mass, causing the fluid to flow into the molten resin mass along a line substantially corresponding to a line along which the preselected portion of the back surface extends, so that the shaped, hollow resin article produced has a hollow in a position corresponding to the preselected portion of the back surface.

According to one preferred embodiment of the present invention, in the injection molding method as defined above, the distance between the opposite, first and second inner wall surfaces of the cavity is at least 1.0 mm as measured at a portion corresponding to the preselected portion of the back surface of the molten resin mass, causing the pressurized fluid to flow in the molten resin mass along a biased level which is closer to the back surface of the molten resin mass than to the front surface of the molten resin mass, thereby producing a shaped, hollow resin article having a thickness of at least 1.0 mm as measured at a portion having a hollow therein, wherein the hollow is located in a biased position which is closer to the back surface of the hollow resin article than to the front surface of the hollow resin article.

According to another preferred embodiment of the present invention, in the injection molding method as defined above, the distance between the opposite, first and second inner wall surfaces of the cavity is 3.5 mm or less as measured at a portion corresponding to the preselected portion of the back surface of the molten resin mass, and the injection molding method further comprises, before introducing the pressurized fluid into the molten resin mass in step (3), adjusting the temperature of the preselected portion of the back surface of the molten resin mass to a level equal to or lower than the temperature of the front surface of the molten resin mass; and subsequently adjusting the temperature of the preselected portion of the back surface of the molten resin mass to a level which is at least 5° C. higher than the temperature of the front surface of the molten resin mass, followed by the maintenance of the temperature of the preselected portion of the back surface of the molten resin mass at the above-mentioned level during step (3), thereby producing a shaped, hollow resin article having a thickness of 3.5 mm or less as measured at a portion having a hollow therein.

For easy understanding of the present invention, various embodiments of the present invention are enumerated below.

1. A method for injection molding a resin while forming a hollow to produce a shaped, hollow resin article, comprising:

(1) providing a mold comprising a fixed mold half and a movable mold half mating with the fixed mold half to thereby provide a cavity defined by an inner wall surface of the fixed mold half and an inner wall surface of the movable mold half, the cavity having opposite, first and second inner wall surfaces, which respectively correspond to a front surface and a back surface of a shaped, hollow resin article to be molded by the mold;

(2) injecting a resin in a molten form into the cavity through a gate for the cavity in an amount of at least 60% of a predetermined amount sufficient to fill the entire volume of the cavity, thereby forming a molten resin mass having opposite, front and back surfaces respectively facing the opposite, first and second inner wall surfaces of the cavity, (3) introducing a pressurized fluid into the molten resin mass through the gate or through an inlet for the fluid which inlet is provided independently from the gate, thereby forming a hollow in the molten resin mass, wherein the introduction of the fluid is conducted without injecting a molten resin into the cavity or while injecting a molten resin into the cavity, and (4) allowing the molten resin mass having the hollow formed therein to cool, thereby producing a shaped, hollow resin article, wherein, during the introduction of the pressurized fluid in step (3), the temperature of at least one preselected portion of the back surface of the molten resin mass is maintained at a level which is at least 5° C. higher than the temperature of the front surface of the molten resin mass, causing the fluid to flow into the molten resin mass along a line substantially corresponding to a line along which the preselected portion of the back surface extends, so that the shaped, hollow resin article produced has a hollow in a position corresponding to the preselected portion of the back surface.

2. The method according to item 1 above, wherein the distance between the opposite, first and second inner wall surfaces of the cavity is at least 1.0 mm as measured at a portion corresponding to the preselected portion of the back surface of the molten resin mass, causing the pressurized fluid to flow in the molten resin mass along a biased level which is closer to the back surface of the molten resin mass than to the front surface of the molten resin mass, thereby producing a shaped, hollow resin article having a thickness of at least 1.0 mm as measured at a portion having a hollow therein, wherein the hollow is located in a biased position which is closer to the back surface of the hollow resin article than to the front surface of the hollow resin article.

3. The method according to item 1 above, wherein the distance between the opposite, first and second inner wall surfaces of the cavity is 3.5 mm or less as measured at a portion corresponding to the preselected portion of the back surface of the molten resin mass, and which further comprises, before introducing the pressurized fluid into the molten resin mass in step (3), adjusting the temperature of the preselected portion of the back surface of the molten resin mass to a level equal to or lower than the temperature of the front surface of the molten resin mass; and subsequently adjusting the temperature of the preselected portion of the back surface of the molten resin mass to a level which is at least 5° C. higher than the temperature of the front surface of the molten resin mass, followed by the maintenance of the temperature of the preselected portion of the back surface of the molten resin mass at the above-mentioned level during step (3), thereby producing a shaped, hollow resin article having a thickness of 3.5 mm or less as measured at a portion having a hollow therein.

4. The method according to any one of items 1 to 3 above, wherein, during the introduction of the pressurized fluid in step (3), the temperature of the preselected portion of the back surface of the molten resin mass is maintained at a level which is at least 12° C. higher than the temperature of the front surface of the molten resin mass.

5. A shaped, hollow resin article produced by the method according to item 1 above, having a hollow of an orderly morphology.

6. A shaped, hollow resin article produced by the method according to item 2 above, having a hollow of an orderly morphology and having a front surface thereof which is in a uniform, smooth surface condition.

7. A shaped, hollow resin article produced by the method according to item 3 above, having a hollow of an orderly morphology and having a front surface thereof which is in a uniform, smooth surface condition.

8. A shaped, hollow resin article produced by the method according to item 4 above, having a hollow of an orderly morphology and having a front surface thereof which is in a uniform, smooth surface condition.

9. A mold for use in the method according to item 1 above, which comprises a fixed mold half and a movable mold half adapted to mate with the fixed mold half to thereby provide a cavity defined by an inner wall surface of the fixed mold half and an inner wall surface of the movable mold half, the cavity having opposite, first and second inner wall surfaces, which respectively correspond to a front surface and a back surface of a shaped, hollow resin article to be molded by the mold, wherein at least one preselected portion of the second inner wall surface of the cavity has a heat insulating member embedded therein, the heat insulating member having a heat conductivity which is $1/10^4$ to $1/30$ of the heat conductivity of the material of each of the mold halves of the mold.

10. A mold for use in the method according to item 2 above, which comprises a fixed mold half and a movable mold half adapted to mate with the fixed mold half to thereby provide a cavity defined by an inner wall surface of the fixed mold half and an inner wall surface of the movable mold half, the cavity having opposite, first and second inner wall surfaces, which respectively correspond to a front surface and a back surface of a shaped, hollow resin article to be molded by the mold, wherein at least one preselected portion of the second inner wall surface of the cavity has a heat insulating member embedded therein, the heat insulating member having its one surface exposed to the cavity, and wherein the heat insulating member has a heat conductivity which is $1/10^4$ to $1/30$ of the heat conductivity of the material of each of the mold halves of the mold, and wherein the distance between the first and second inner wall surfaces of the cavity is at least 1.0 mm as measured at the preselected portion of the second inner wall surface of the cavity when the fixed mold half is mated with the movable mold half.

11. A mold for use in the method according to item 3 above, which comprises a fixed mold half and a movable mold half adapted to mate with the fixed mold half to thereby provide a cavity defined by an inner wall surface of the fixed mold half and an inner wall surface of the movable mold half, the cavity having opposite, first and second inner wall surfaces, which respectively correspond to a front surface and a back surface of a shaped, hollow resin article to be molded by the mold, wherein at least one preselected portion of the second inner wall surface of the cavity has a heat insulating member and a heat conductive layer disposed on the heat insulating member on a side of the cavity, the heat insulating member and the heat conductive layer being embedded in the preselected portion of the second inner wall surface, and wherein the heat insulating member has a heat conductivity which is $1/10^4$ to $1/30$ of the heat conductivity of the material of each of the mold halves of the mold, and the heat conductive layer has a heat conductivity which is equal to or larger than the heat conductivity of the material of each of the mold halves of the mold, and wherein the distance between the first and second inner wall surfaces of the cavity is 3.5 mm or less as measured at the preselected portion of the second inner wall surface of the cavity when the fixed mold half is mated with the movable mold half.

In the embodiment of item 1 above, the temperature of a back surface of a molten resin mass corresponding to the shaped resin article to be produced (hereinafter, frequently referred to simply as a "molten resin mass") at its portion in which a hollow is to be formed is maintained at a level which is at least 5° C. higher than the temperature of a front surface of the molten resin mass, to thereby surely lead the flow of the introduced pressurized fluid in the molten resin mass substantially along a preselected line.

In the embodiment of item 2 above, the preselected location for a hollow to be formed in the resultant shaped article is in a portion of the shaped resin article which has a relatively large thickness. In the embodiment of item 3 above, the preselected location for a hollow to be formed in the resultant shaped article is in a portion of the shaped resin article which has a relatively small thickness.

The reason why, in the method of the present invention, the preferred embodiments are varied depending on the thickness of the resultant shaped, hollow resin article at its portion having a hollow therein resides in that the mechanism of occurrence of a non-uniformity in the gloss and luster of a shaped, hollow resin article is varied depending on the thickness of the shaped article at its portion having a hollow therein. A detailed explanation is given below on this point.

A mold is provided which has at least one heat insulating member embedded in an inner wall surface of the cavity thereof, which surface corresponds to a back surface of a shaped resin article to be produced, so as to provide at least one heat insulating region which lowers the cooling rate of a molten resin mass at a preselected resin region thereof corresponding to the heat insulating region. When injection molding is conducted using the mold without introducing a pressurized fluid into the molten resin mass, in some cases, a distinct sink mark occurs at a portion of the front surface of the shaped, hollow resin article produced, which is located opposite to the portion of the back surface of the shaped article which corresponds to the heat insulating region, and in other cases, almost no sink mark occurs.

More specifically, it has been confirmed by the present inventors that in the case of the production of a shaped resin article having a relatively large thickness, even when injection molding is conducted, using the above-mentioned mold having a heat insulating member embedded in an inner wall surface of the cavity thereof (which surface corresponds to the back surface of the shaped resin article to be produced) so as to provide a heat insulating region, without introducing a pressurized fluid into a molten resin mass, almost no sink mark occurs in the front surface of the shaped, hollow resin article at the portion opposite to the portion in the back surface of the shaped article which portion corresponds to the heat insulating region.

Under certain conditions, when use is made of the above-mentioned mold for the production of a shaped resin article having a relatively large thickness, which mold has a heat insulating member but does not cause occurrence of a sink mark in the front surface of a shaped resin article (at the portion opposite to the preselected portion of the back surface which corresponds to the heat insulating region), and a molten resin is injected into the mold cavity, followed by introduction of a pressurized fluid into the molten resin mass, so as to lead the introduced pressurized fluid to a preselected resin region corresponding to the heat insulating region, a problem arises such that with respect to the front surface of the obtained shaped resin article, the surface of the local outer portion of the shaped article (which portion corresponds to the hollow portion in the shaped article) is different in gloss and luster from the surface of the portion surrounding the local outer portion.

The above-mentioned certain conditions are such that the heat conductivity of the heat insulating member is only a little smaller than the heat conductivity of the metal used as the material of the mold, that is, the temperature difference between the front surface and the back surface of the molten resin mass is small.

In this case, the hollow formed (when the pressurized fluid is led to a preselected resin region corresponding to the heat insulating region) is located substantially in a middle region of the molten resin mass as viewed along the thickness of the molten resin mass, and extends along a line substantially perpendicular to the thicknesswise direction of the molten resin mass. The reason why the hollow is formed substantially in such a middle region is that when a portion of the molten resin mass which corresponds to a preselected location for a hollow to be formed has a relatively large thickness, the molten resin mass has a large heat capacity, so that the temperature difference between the resin temperature of the back surface side of the molten resin mass and the resin temperature of the front surface side of the molten resin mass is relatively small, and therefore, almost no temperature gradient is produced between the back surface side and the front surface side of the molten resin mass.

On the other hand, it has been confirmed that when use is made of a mold for the production of a shaped resin article having a relatively large thickness, which mold has a heat insulating member but does not cause occurrence of a sink mark in the front surface of a shaped resin article (at a portion opposite to the preselected portion of the back surface which corresponds to the heat insulating region), in which, however, the heat conductivity of the heat insulating member is considerably smaller than the heat conductivity of the metal used as the material of the mold, and a molten resin is injected into the mold cavity, followed by introduction of a pressurized fluid into the molten resin mass, to thereby produce a shaped, hollow resin article, occurrence of a non-uniform gloss and luster in the front surface of a local outer portion of the shaped resin article (which corresponds to the hollow portion in the shaped article) is not caused.

In this case, the hollow extends substantially along a line substantially perpendicular to the thickness of the molten resin mass, and is located in a biased position which is closer to the back surface of the molten resin mass (i.e., closer to the heat insulating member) than to the front surface of the molten resin mass. The reason why the hollow is formed in such a position as mentioned above resides in the fact that the temperature difference between the front and back surfaces of the molten resin mass (at its portion corresponding to the heat insulating region) is large, so that a considerable temperature gradient is produced between the back surface side and the front surface side of the molten resin mass and, therefore, the cooling conditions of the molten resin mass become different on the respective sides.

From the above, it is apparent that, in the case of the production of a shaped article having a relatively large thickness at a portion corresponding to the heat insulating region and a portion surrounding the above portion, occurrence of a non-uniformity in gloss and luster (of the front surface of a shaped, hollow resin article produced by introducing a pressurized fluid in the molten resin mass) depends on the location of a hollow as viewed along the thickness of the shaped, hollow resin article. The reason why the occurrence of the non-uniformity in gloss and luster is influenced by the location of the hollow has not been elucidated. However, the present inventors speculate as follows.

It is considered that, in the case of the production of a shaped article having a relatively large thickness at its portion corresponding to the heat insulating region and a portion surrounding the above portion, the molten resin mass (at its portion corresponding to the heat insulating region) has a large heat capacity so that the tendency that the cooling of the entire molten resin mass gradually proceeds is promoted. Therefore, it is unlikely that, just after the injection of a molten resin, a shrinkage of the resin caused by the cooling of the resin is concentrated in the front surface of the molten resin mass (at a portion opposite to a preselected portion of the back surface which corresponds to the heat insulating region) to cause a sink mark, but the shrinkage is consumed as a decrease in thickness of the molten resin mass, so that the contact pressure between the front surface of the molten resin mass and the inner wall surface of the mold cavity facing thereto becomes weak. When a pressurized fluid is introduced at this stage into a preselected resin region corresponding to the heat insulating region, the front surface of the molten resin mass is again strongly pushed against the inner wall surface of the mold cavity facing the above front surface in accordance with the flowing of the introduced pressurized fluid. In the case where the hollow is located at a middle region of the molten resin mass as viewed along the thickness of the molten resin mass, the effect of the pressurized fluid on the molten resin mass to press the front surface against the inner wall surface of the mold cavity facing thereto is large, as compared to the case where the hollow is located in a biased position which is closer to the back surface of the molten resin mass. Therefore, a non-uniformity is likely to occur in gloss and luster of the shaped, hollow resin article. Whereas, in the case where the hollow is located in a biased position which is closer to the back surface of the molten resin mass, the biased location of the hollow alleviates the effect of the pressurized fluid on the molten resin mass to press the front surface against the inner wall surface of the mold cavity facing thereto, so that a non-uniformity is unlikely to occur in gloss and luster of the resultant shaped article.

On the other hand, in the case of the production of a shaped article having a relatively small thickness, when injection molding is conducted, without introducing a pressurized fluid into a molten resin mass, using a mold having at least one heat insulating member embedded in an inner wall surface of the cavity thereof (which surface corresponds to a back surface of the molten resin mass) so as to provide at least one heat insulating region, a distinct sink mark occurs in a front surface of the resultant shaped article (at its portion opposite to the portion in the back surface thereof which portion corresponds to the heat insulating region). Such a sink mark always occurs when the heat insulating member is used, regardless of the magnitude of difference in heat conductivity between the mold and the heat insulating member.

When such a mold causing the occurrence of a distinct sink mark is used for gas injection molding of a resin to produce a shaped article having a relatively small thickness, with respect to the front surface of the resultant shaped article, the surface of a local outer portion of the resultant shaped article (which portion corresponds to the heat insulating region) is different in gloss and luster from the surface of the portion surrounding the local outer portion. The non-uniformity in gloss and luster in the surface of the local outer portion occurs in accordance with the contour of the heat insulating member, even when the heat conductivity of the heat insulating member is considerably smaller than that of the mold.

With respect to this phenomenon, the present inventors presume that such a non-uniformity in gloss and luster occurs because of the occurrence of a sink mark. More specifically, in the case of the production of a shaped article having a relatively small thickness, when use is made of a mold having at least one heat insulating member embedded in an inner wall surface of the cavity thereof (which surface corresponds to a back surface of the resultant shaped article at its portion having a relatively small thickness) to thereby provide at least one heat insulating region, a sink mark occurs at a portion in a front surface of the molten resin mass in the mold cavity. Accordingly, the introduction of a pressurized fluid into the molten resin mass is conducted after the occurrence of such a sink mark. As a result, a local outer portion in the front surface of the molten resin mass, which has sunk and been separated from the inner wall surface of the mold cavity, is again pushed against the inner wall surface of the mold cavity facing the above front surface in accordance with the flowing of the introduced pressurized fluid, so that a non-uniformity in gloss and luster is produced between the local outer portion in the front surface of the shaped article and the portion surrounding the above local portion.

The present inventors have made the following presumption with respect to the cause of a distinct sink mark, which occurs in a front surface of a shaped article having a relatively small thickness when the shaped article is produced using a mold having at least one heat insulating member embedded in a portion of the inner wall surface of the cavity thereof (which surface corresponds to the back surface of the hollow resin article to be molded by the mold) to thereby provide at least one heat insulating region. The cause of the distinct sink mark resides in the fact that, because the heat capacity of the filled molten resin mass is not satisfactorily large, the front surface of the molten resin mass (at its portion opposite to a portion in the back surface thereof which portion corresponds to the heat insulating region) inevitably has a high cooling rate, thus allowing the formation of a skin layer on the front surface of the molten resin mass to rapidly advance as compared to the skin layer formation on the back surface of the molten resin mass (at its portion which corresponds to the heat insulating region).

In contrast, in the above-mentioned injection molding method for obtaining a shaped article having a relatively large thickness, as mentioned above, the cooling of the entire molten resin mass gradually proceeds due to the large heat capacity of the molten resin mass. In such a case as well, a difference in temperature occurs between the front surface of the molten resin mass (at its portion opposite to a portion in the back surface thereof which portion corresponds to the heat insulating region) and the back surface of the molten resin mass (at its portion which corresponds to the heat insulating region). However, the cooling rate of the front surface of the molten resin mass (at its portion opposite to a portion in the back surface thereof which portion corresponds to the heat insulating region) is low, so that immediately after injecting of the molten resin, formation of the skin layer on the front surface of the molten resin mass advances at nearly the same rate as in the skin layer formation on the back surface of the molten resin mass.

Therefore, it is believed that with respect to the production of a shaped, hollow resin article having a relatively small thickness, the occurrence of a sink mark can be prevented as measured at a portion corresponding to the heat insulating region by adjusting, immediately after injecting a molten resin, the temperature of the back surface of the molten resin mass to a level equal to the temperature of the front surface of the molten resin mass and allowing the back surface and front surface of the molten resin mass to cool at nearly the same rate. Further, it is believed that an improved surface condition of the front surface of a shaped article can be achieved by causing occurrence of a sink mark in the back surface of the shaped article (the occurrence of a sink mark in the back surface is induced by adjusting the temperature of the back surface of the molten resin mass to a level lower than the temperature of the front surface of the molten resin mass), and subsequently adjusting the temperature of the back surface of the molten resin mass to a level higher than the temperature of the front surface of the molten resin mass.

Hereinafter, the present invention will be described in more detail with reference to the accompanying drawings.

As described above, basically, the method of the present invention is characterized in that, during the introduction of the pressurized fluid in step (3), the temperature of the at least one preselected portion of the back surface of the molten resin mass is maintained at a level which is at least 5° C. higher than the temperature of the front surface of the molten resin mass, causing the fluid to flow into the molten resin mass along a line substantially corresponding to a line along which the at least one preselected portion of the back surface extends, so that the shaped, hollow resin article produced has a hollow in a position corresponding to the at least one preselected portion of the back surface.

By the method of the present invention, a shaped, hollow resin article having a hollow of an orderly morphology can be obtained.

In the method of the present invention, during the introduction of the pressurized fluid in step (3), the temperature of the at least one preselected portion of the back surface of the molten resin mass is maintained at a level which is higher, by at least 5° C., preferably 5° C. to 200° C., more preferably 12° C. to 100° C., still more preferably 20° C. to 80° C., than the temperature of the front surface of the molten resin mass.

According to one preferred embodiment of the present invention (embodiment of item 2 of the above-enumerated embodiments of the present invention), the distance between the opposite, first and second inner wall surfaces of the cavity is at least 1.0 mm, preferably 1.0 mm to 7 mm as measured at a portion corresponding to the at least one preselected portion of the back surface of the molten resin mass, causing the pressurized fluid to flow in the molten resin mass along a biased level which is closer to the back surface of the molten resin mass than to the front surface of the molten resin mass, thereby producing a shaped, hollow resin article having a thickness of at least 1.0 mm, preferably 1.0 mm to 7 mm as measured at a portion having a hollow therein. The hollow is located in a biased position which is closer to the back surface of the hollow resin article than to the front surface of the hollow resin article.

In the embodiment of item 2 above, the thickness of a molten resin mass at each of a local portion (in which a hollow is to be formed) and a portion surrounding the local portion is selected so as to cause almost no sink mark in the front surface of a resultant shaped article produced by conducting injection molding, without introducing a pressurized fluid, while adjusting the temperature of the back surface of the local portion of the molten resin mass to a level higher than the temperature of the front surface of the molten resin mass. By locating hollow 7 (see FIG. 3) in a biased position which is closer to the back surface of the hollow resin article than to the front surface of the hollow resin article, occurrence of a non-uniformity in the gloss and luster of the front surface of the hollow resin article can be prevented. In this embodiment as well, during the introduction of a pressurized fluid, the temperature of the at least one preselected portion of the back surface of a molten resin mass is maintained at a level which is higher, by preferably 5 to 200° C., more preferably 12 to 100° C., most preferably 20 to 80° C., than the temperature of the front surface of the molten resin mass.

For forming hollow 7 (see FIG. 3) which is located in a biased position which is closer to the back surface of the hollow resin article than to the front surface thereof (which back surface corresponds to a high temperature side of the molten resin mass), it is requisite that the above-mentioned temperature conditions be satisfied during the introduction of the pressurized fluid in step (3). When the above-mentioned temperature conditions are not satisfied during the introduction of the pressurized fluid, a hollow cannot be located in a biased position which is closer to the back surface of the hollow resin article than to the front surface of the hollow resin article, so that occurrence of a non-uniformity in the gloss and luster of the front surface of the hollow resin article cannot be prevented. In addition, in this case, it becomes difficult to produce a temperature difference between the preselected portion of the molten resin mass at which portion a hollow is to be formed and other portions of the molten resin mass, so that it becomes difficult to lead the pressurized fluid in orderly fashion in the molten resin mass.

The above-mentioned temperature difference between the front and back surfaces of a molten resin mass at its portion in which a hollow is to be formed can be produced, for example, by heating a preselected portion of the cavity inner wall surface facing the back surface of the molten resin mass by means of a heater. However, the above-mentioned temperature difference can also be produced by using a mold having heat insulating member 6 embedded in a preselected portion of the cavity inner wall surface corresponding to the back surface of the molten resin mass. The use of heat insulating member 6 is more preferred than the use of a heater because not only can the above-mentioned temperature difference be surely produced by heat insulating member 6 embedded in a preselected portion of a cavity inner wall surface, but also a working on a mold for the embedding of heat insulating member 6 in a cavity inner wall surface can be easily conducted, as compared to the provision of a heater or the like.

Accordingly, in the embodiment of item 9 of the above-enumerated embodiments of the present invention, there is provided a mold for use in the method of item 1 above. This mold comprises a fixed mold half and a movable mold half adapted to mate with the fixed mold half to thereby provide a cavity defined by an inner wall surface of the fixed mold half and an inner wall surface of the movable mold half. The cavity has opposite, first and second inner wall surfaces, which respectively correspond to a front surface and a back surface of a shaped, hollow resin article to be molded by the mold. At least one preselected portion of the second inner wall surface of the cavity has a heat insulating member embedded therein. The heat insulating member has a heat conductivity which is $1/10^4$ to $1/30$ of the heat conductivity of the material of each of the mold halves of the mold.

The fixed mold half and movable mold half may be or may not be made from the same material. It is preferred that the material of the fixed mold half and the material of the movable mold half be substantially identical with each other in heat conductivity. It is desired that the fixed mold half and movable mold half be made from the same material.

In the embodiment of item 10 of the above-enumerated embodiments of the present invention, there is provided a mold for use in the method of item 2 above. This mold comprises a fixed mold half and a movable mold half adapted to mate with the fixed mold half to thereby provide a cavity defined by an inner wall surface of the fixed mold half and an inner wall surface of the movable mold half. The cavity has opposite, first and second inner wall surfaces, which respectively correspond to a front surface and a back surface of a shaped, hollow resin article to be molded by the mold. At least one preselected portion of the second inner wall surface of the cavity has a heat insulating member embedded therein. The heat insulating member has its one surface exposed to the cavity, and the heat insulating member has a heat conductivity which is $1/10^4$ to $1/30$ of the heat conductivity of the material of each of the mold halves of the mold. The distance between the first and second inner wall surfaces of the cavity is at least 1.0 mm as measured at the at least one preselected portion of the second inner wall surface of the cavity when the fixed mold half is mated with the movable mold half.

Figure 2:
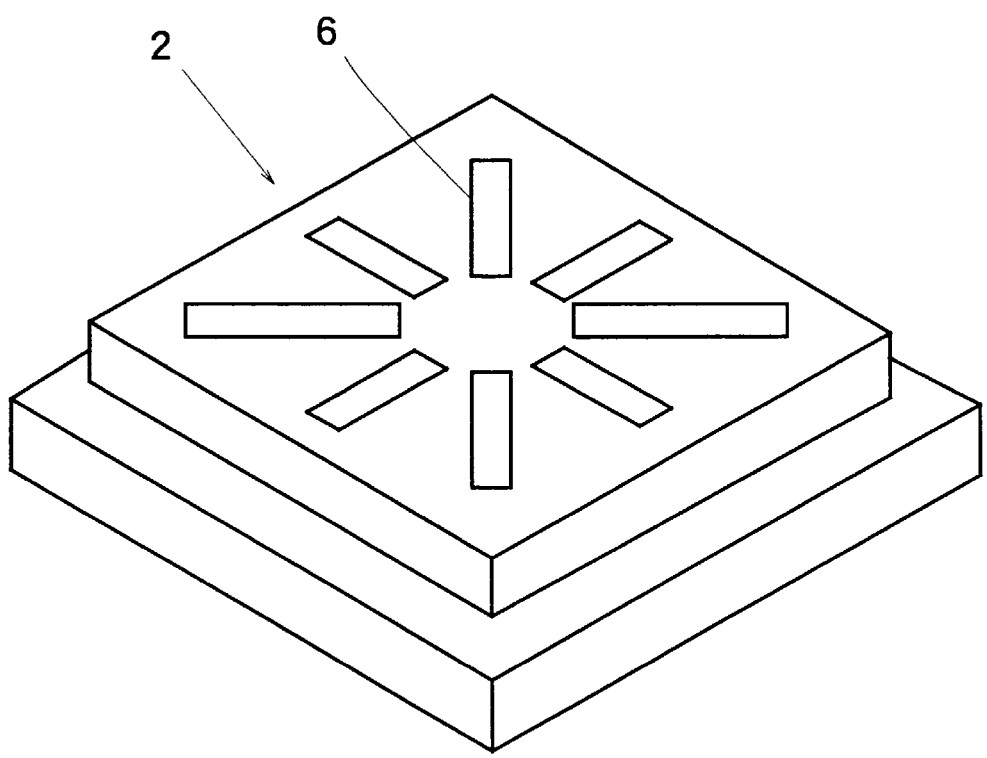
FIG. 2 is a diagrammatic, perspective view of a movable mold half of the mold of FIG. 1, showing the inner wall surface thereof.

As shown in FIGS. 1 and 2, the mold comprises fixed mold half 1 and movable mold half 2 adapted to mate with fixed mold half 1 to thereby provide mold cavity 3 defined by an inner wall surface of fixed mold half 1 and an inner wall surface of movable mold half 2. Numeral 4 designates a molten resin injection nozzle, and the molten resin injection nozzle has, provided therein, nozzle 5 for introducing a pressurized fluid. Pressurized fluid introduction nozzle 5 is connected to a source (not shown) of a pressurized fluid (e.g., a source of a pressurized gas).

Pressurized fluid introduction nozzle 5 is provided in order to introduce a pressurized fluid into a molten resin mass in mold cavity 3. There is no particular limitation with respect to the type of nozzle 5 as long as a pressurized fluid can be introduced into a molten resin mass in mold cavity 3. As a pressurized fluid introduction nozzle, besides the above-mentioned nozzle 5 which is provided in molten resin injection nozzle 4, there can be employed, for example, a nozzle passing through the wall of the mold cavity so that a pressurized fluid is directly introduced into a molten resin mass in a mold cavity without passing through a gate, and a nozzle which is provided in the sprue or runner so that a pressurized fluid is introduced into a molten resin mass in a mold cavity through a gate.

Heat insulating members 6 are embedded in movable mold half 2 on a side of cavity 3. The reason for this is that if heat insulating members 6 are embedded in fixed mold half 1 at a portion corresponding to the front surface of a shaped resin article to be produced, the surface appearance of the front surface of the resultant shaped resin article would become poor due to the trace of embedded heat insulating members 6. In the case where fixed mold half 1 corresponds to the back surface of a shaped resin article to be produced, heat insulating members 6 are embedded in fixed mold half 1 on a side of cavity 3. In the present invention, heat insulating member 6 has a thickness of preferably 1.0 to 100 mm, more preferably 5 to 50 mm, still more preferably 5 to 10 mm.

It is necessary that heat insulating member 6 have a heat conductivity which is $1/10^4$ to $1/30$ of the heat conductivity of the material of each of the mold halves of the mold. Preferably, the heat conductivity of heat insulating member 6 is $1/10^3$ to $1/10^2$ of the heat conductivity of the material of each of the mold halves of the mold. When the heat conductivity of heat insulating member 6 is too high, in the injection molding according to the method of the embodiment of item 1 above, the temperature difference between the front surface and the back surface of a molten resin mass cannot be increased to 5° C. or higher during the introduction of a pressurized fluid, so that the location of hollow 7 (see FIG. 3) in the molten resin mass cannot be surely controlled. Also when the heat conductivity of heat insulating member 6 is too high, in the injection molding according to the method of the embodiment of item 2 above, depending on the shape of an intended shaped article, in some cases, hollow 7 (see FIG. 3) cannot be formed in a biased position in a molten resin mass which is closer to the back surface of the molten resin mass having heat insulating members 6 embedded therein corresponding to the back surface of a shaped resin article to be produced, so that the occurrence of the non-uniformity in gloss and luster cannot be prevented. Further, a temperature difference between a local portion of a molten resin mass which corresponds to heat insulating member 6 and a portion surrounding the above local portion is difficult to produce, so that it becomes difficult to control the flow of a pressurized fluid in the molten resin mass. On the other hand, when the heat conductivity of heat insulating member 6 is too low, the cooling rate of a molten resin mass becomes low, so that the molding cycle time is disadvantageously prolonged.

Heat insulating member 6 need not be of a single structure and, as described below, a layer which is capable of supplementing the heat insulating property of heat insulating member 6, such as heat insulating layer 8 (see FIG. 4), may be disposed on heat insulating member 6 on a side of the cavity. Other structures of heat insulating member 6 can also be employed as long as substantially the same heat insulation effect can be obtained as is obtained with heat insulating member 6 of a single structure having a heat conductivity which is $1/10^4$ to $1/30$ of the heat conductivity of the material of each of the mold halves of the mold.

The material for heat insulating member 6 is varied depending on the type of the material of each of the mold halves of the mold, and can be selected from materials which have a relatively low heat conductivity and are resistant to the pressure and temperature used in injection molding, for example, synthetic resins (such as an epoxy resin, a polyimide resin and bakelite), hard glass, and ceramics (such as alumina).

Mold cavity 3 shown in FIG. 1 has a morphology such that a shaped article of a plate type having a substantially uniform thickness can be produced. However, the morphology of mold cavity 3 is not limited thereto. For example, in the case of the mold according to the embodiment of item 10 above which is for use in the injection molding method according to the embodiment of item 2 above, the distance between the first and second inner wall surfaces of the cavity defined by the inner wall surface of the mold is at least 1.0 mm, preferably 1.0 to 7.0 mm, as measured at the at least one preselected portion of the second inner wall surface of the cavity when the fixed mold half is mated with the movable mold half. The thickness of a shaped resin article to be produced using the mold according to the embodiment of item 10 above is equivalent to the relatively large thickness of the above-mentioned shaped resin article at each of a portion corresponding to the heat insulating region and a portion surrounding the above portion. In this case, when a mold has heat insulating member 6 embedded in an inner wall surface thereof to provide a heat insulating region, and an injection molding is then conducted using the mold without introducing a pressurized fluid into the molten resin mass, almost no sink mark occurs in the front surface of a shaped, hollow resin article produced at a portion opposite to the portion in the back surface of the shaped article which corresponds to the heat insulating region. When the mold for producing a shaped article having the above-mentioned relatively large thickness is used to form hollow 7 (see FIG. 3) in a biased position which is closer to the back surface of the molten resin mass than to the front surface of the molten resin mass, occurrence of a non-uniformity in gloss and luster of a front surface of a shaped, hollow resin article to be produced can be prevented.

In the present invention, a hollow is formed in a molten resin mass at a preselected portion thereof by leading a pressurized fluid to the molten resin mass in orderly fashion. This can be achieved by embedding heat insulating member 6 in an inner wall surface of movable mold half 2 of a mold at a portion corresponding to the preselected portion of the molten resin mass, so that a temperature difference between the front and back surfaces of a molten resin mass can be produced. For example, heat insulating member 6 can be embedded in an inner wall surface of movable mold half 2 so as to extend radially of the center of movable mold half 2.

Hereinbelow, referring to FIGS. 1 and 2, one embodiment of the injection molding method of the present invention is described in which use is made of a mold having heat insulating members 6 embedded in an inner wall surface of movable mold half 2 of the mold, so that a temperature difference between the front and back surfaces of a molten resin mass can be produced.

A resin in a molten form is injected into mold cavity 3 in a predetermined amount to form a molten resin mass, followed by introduction of a pressurized fluid into the molten resin mass. With respect to the amount of the molten resin to be injected, the molten resin may be injected in an amount sufficient to fill the entire volume of mold cavity 3 (full shot), or may be injected in an amount smaller than such an amount (short shot) (in the case of a short shot, the amount of the molten resin is not smaller than 60% of the amount of the molten resin for a full shot). The introduction of a pressurized fluid can be conducted even after a molten resin is injected into the mold cavity in an amount sufficient to fill the entire volume of the mold cavity, because a molten resin undergoes volume contraction upon cooling.

As in the case of a conventional injection molding, the injection of a molten resin is conducted using an injection molding machine having molten resin injection nozzle 4 through which the molten resin is injected.

With respect to the resin which can be used in the present invention, not only a thermoplastic resin which is generally employed for a conventional injection molding or extrusion molding, but also a thermosetting resin can be used. Examples of thermoplastic resins which can be used in the present invention include polyethylene, polypropylene, polystyrene, ABS resins, polyvinyl chloride, polyamides, acetal polymers, polycarbonates, modified polyphenylene ethers, polyethylene terephthalate, polybutylene terephthalate, polyphenylene sulfide, polyimides, polyamide imides, polyether imides, polyarylates, polysulfones, polyether sulfones, polyetheretherketones, liquid crystalline resins, polytetrafluoroethylene and thermoplastic elastomers. Examples of thermosetting resins which can be used in the present invention include phenolic resins, urea resins, melamine resins, unsaturated polyesters, a diallyl phthalate resin and silicone resins. Further, if desired, various types of additives, fillers or the like can be added to the resin.

The introduction of the pressurized fluid can be conducted in various ways. For example, the pressurized fluid may be introduced into mold cavity 3 from pressurized fluid introduction nozzle 5 provided in molten resin injection nozzle 4, or may be directly introduced into mold cavity 3 from pressurized fluid introduction nozzle 5 provided in a cavity inner wall as mentioned above, or may be introduced through a sprue or a gate.

The fluid which can be used as a pressurized fluid in the present invention is a fluid which is gaseous or liquid at room temperature under atmospheric pressure, and which is not reactive to or compatible with a molten resin to be molded, under temperature and pressure conditions for injection molding. Examples of such fluids include nitrogen, carbon dioxide, air, helium, neon, argon, water, liquid paraffin, glycerin, an oligomer and a lower alcohol. An inert gas, such as nitrogen, is preferable. Generally, the fluid is pressurized to a pressure of from about 10 to about 500 $kg/cm^2$. When a resin, such as an oligomer, is used as a pressurized fluid, the resin as a pressurized fluid remains in the shaped article produced, so that a hollow is not formed in the shaped article, and the shaped resin article has a section constituted by the introduced pressurized fluid, which is distinct from the body section of the shaped article which is formed from the molten resin mass.

As mentioned above, during the introduction of a pressurized fluid into the molten resin mass, it is requisite that the above-mentioned temperature conditions be satisfied with respect to the front and back surfaces of the molten resin mass at portions thereof corresponding to a portion in which a hollow is to be formed. When the pressurized fluid is introduced into the molten resin mass under the above-mentioned temperature conditions, in the embodiment of item 1 above, the pressurized fluid flows into the molten resin mass along a line substantially corresponding to a line along which the at least one preselected portion of the back surface of the molten resin mass extends; and in the embodiment of item 2 above, not only does the pressurized fluid flow into the molten resin mass along a line substantially corresponding to a line along which the at least one preselected portion of the back surface of the molten resin mass extends, but also the pressurized fluid flows in the molten resin mass along a biased level which is closer to the back surface of the molten resin mass than to the front surface of the molten resin mass.

Figure 3:
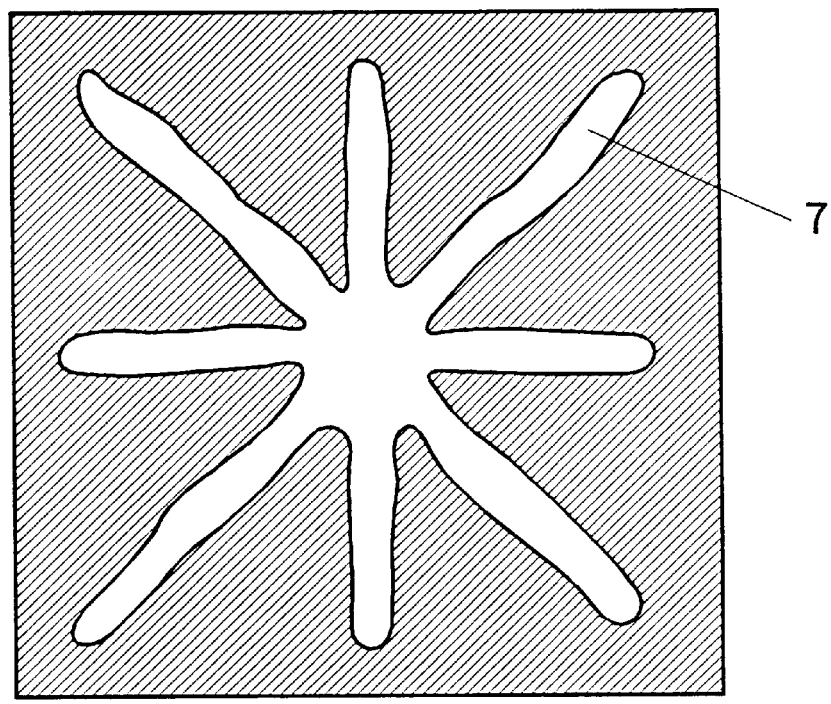
FIG. 3 is a diagrammatic, horizontal cross-sectional view of a shaped, hollow resin article produced using the mold of FIG. 1.

When the pressurized fluid is, for example, a gas, the introduction of the pressurized gas is conducted and, subsequently, an appropriate period of time is allowed to lapse, during which the gas pressure is held while allowing the molten resin to cool. Then, the introduced pressurized gas is discharged from the mold cavity and the resultant shaped, hollow resin article is taken out from the cavity. For example, the obtained shaped article has a hollow having a radial configuration which extends from the central portion of the shaped article toward the circumference of the shaped article as shown in FIG. 3. Specifically, a hollow can be formed in the shaped article at its portion corresponding to a preselected portion of the molten resin mass, which preselected portion is a portion in which a hollow is to be formed and is maintained at a high temperature by the heat insulating member. A shaped article produced by the method of the embodiment of item 1 above has a hollow in a position corresponding to the at least one preselected portion of the back surface of the molten resin mass, so that the hollow has an orderly morphology. A shaped article produced by the method of the embodiment of item 2 above has further characteristics such that a hollow is located in a biased position which is closer to the back surface of the hollow resin article, and the front surface thereof is in a uniform, smooth surface condition.

The location or morphology of a hollow to be formed in the shaped resin article is not limited to a radial form, and may be varied depending on the shape, size, and intended use of the resultant shaped resin article. For example, in the case of a shaped resin article having a plurality of bosses, ribs or the like which are formed so as to hold a flat plate-like section therebetween, it is preferred that the location or morphology of a hollow to be formed be selected so that the bosses or ribs are interconnected with one another by the hollow so as to lead a pressurized fluid to the bosses and ribs.

Figure 4:
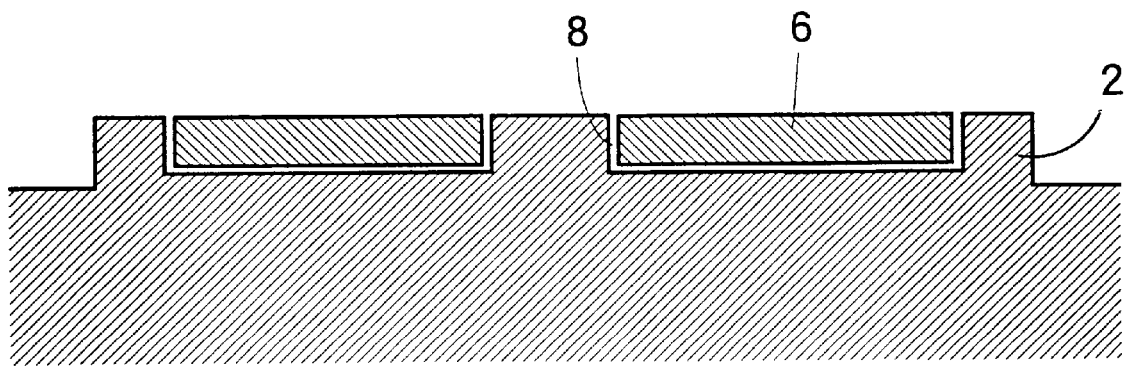
FIG. 4 is a diagrammatic, vertical cross-sectional view of another form of a movable mold half, showing another form of a heat insulating member which can be used instead of the heat insulating member of the mold of FIG. 1.

When heat insulating member 6 is embedded in the inner wall surface of movable mold half 2, a gap (for example, a gap of about 20 μm) can be provided between heat insulating member 6 and movable mold half 2 as shown in FIG. 4. The gap is filled with a gas (such as air) or a liquid (such as Vaseline or liquid paraffin) as heat insulating layer 8 so as to supplement the heat insulating property of heat insulating member 6. When heat insulating layer 8 is air, injection molding can be conducted without sealing heat insulating layer 8, provided that the gap is narrow so that a molten resin cannot get into heat insulating layer 8. However, for avoiding the leakage of a gas or liquid as heat insulating layer 8 from the gap, it is preferred that the gap be sealed with a sealant, such as tetrafluoroethylene, etc. Heat insulating member 6 is secured onto movable mold half 2 by means of, for example, a bolt or the like.

Mold cavity 3 shown in each of FIGS. 1 and 2 has a substantially uniform thickness (that is, distance between the opposite, first and second inner wall surfaces of the mold cavity is substantially uniform), however, the thickness of mold cavity 3 is not necessarily uniform. In the method according to the embodiment of item 2 above, as long as the distance between the opposite, first and second inner wall surfaces of the mold cavity is at least 1.0 mm as measured at a portion (which contains heat insulating member embedded therein) corresponding to the at least one preselected portion of the back surface of the molten resin mass (at which a hollow is to be formed), the distance between the opposite, first and second inner wall surfaces of the mold cavity at a portion other than the above portion may be different from the above-defined distance.

Since the heat capacity of a molten resin is large in the embodiment of item 2 above, not only is the back surface of the injected molten resin mass not rapidly cooled immediately after injection but also the front surface of the injected molten resin mass (which faces the inner wall surface of the mold cavity having no heat insulating member embedded therein). Accordingly, the first inner wall surface of the mold cavity (which is located opposite to the second inner wall surface of the mold cavity having heat insulating member 6 embedded therein), that is, the inner wall surface of the mold cavity corresponding to the front surface of a shaped article to be produced, can be coated with a material having a heat conductivity which is lower than the heat conductivity of the material of the mold, so that the gradual cooling of the entire molten resin mass can be promoted. In this case, from the viewpoint of preventing the prolongation of cooling, it is preferred that the coating thickness is 0.001 to 0.9 mm, although the heat conductivity of the coating material is within substantially the same range as the heat conductivity range of heat insulating member 6.

For the same purpose as mentioned above, it is preferred that the inner wall surface of the mold cavity corresponding to the front surface of a shaped article to be produced be deeply granulated. By this treatment, it is unlikely that the molten resin mass will come into close contact with the inner wall surface of the mold which has been deeply granulated and, therefore, the cooling rate of the molten resin mass becomes moderate due to the presence of air remaining between the molten resin mass and the bottoms of the concaves of the granulated inner wall surface.

According to another preferred embodiment of the present invention (embodiment of item 3 of the above-enumerated embodiments of the present invention), in the injection method as defined above in item 1, the distance between the opposite, first and second inner wall surfaces of the cavity is set to be 3.5 mm or less, preferably 3.5 to 0.5 mm, as measured at a portion corresponding to at least one preselected portion of the back surface of the molten resin mass. The injection method further comprises, before introducing the pressurized fluid into the molten resin mass in step (3), adjusting the temperature of the at least one preselected portion of the back surface of the molten resin mass to a level equal to or lower than the temperature of the front surface of the molten resin mass; and subsequently adjusting the temperature of the at least one preselected portion of the back surface of the molten resin mass to a level which is at least 5° C. higher than the temperature of the front surface of the molten resin mass, followed by the maintenance of the temperature of the at least one preselected portion of the back surface of the molten resin mass at the level during step (3), thereby producing a shaped, hollow resin article having a thickness of 3.5 mm or less, preferably 3.5 to 0.5 mm, as measured at a portion having a hollow therein.

Differing from the embodiment of item 2 above, the embodiment of item 3 above is employed when a local portion of the molten resin mass which corresponds to the above-mentioned heat insulating region has a relatively small thickness.

In the embodiment of item 3 above, the thickness of a molten resin mass at a local portion (in which a hollow is to be formed) and the portion surrounding the local portion is selected so as to allow a sink mark to occur in the front surface of the resultant shaped article when injection molding is conducted, without introducing a pressurized fluid, while adjusting the temperature of the back surface of the local portion of the molten resin mass to a level higher than the temperature of the front surface of the molten resin mass. In this embodiment as well, during the introduction of a pressurized fluid, the temperature of the at least one preselected portion of the back surface of a molten resin mass is maintained at a level which is higher, by preferably 5 to 200° C., more preferably 12 to 100° C., most preferably 20 to 80° C., than the temperature of the front surface of the molten resin mass.

The reason why the above-mentioned thickness conditions should be employed resides in the fact that a non-uniformity of gloss and luster in the front surface of a resultant shaped, hollow resin article can be avoided by preventing the occurrence of a distinct sink mark in the front surface of the shaped article, or by allowing a sink mark to occur in the back surface of the shaped article in preference to the front surface of the shaped article.

In the embodiment of item 3 above, the resin temperature of the local portion (which corresponds to a portion in which a hollow is to be formed) in the back surface of a molten resin mass is adjusted to a level equal to or lower than the resin temperature of the front surface of the molten resin mass, and subsequently is adjusted to a level at least 5° C. higher than the resin temperature of the front surface of the molten resin mass before the introduction of a pressurized fluid, so that no distinct sink mark occurs in the front surface of the resultant shaped article or a sink mark occurs in the back surface of the resultant shaped article.

In step (3) of this embodiment, when the temperature of the at least one preselected portion of the back surface of the molten resin mass is adjusted to a level equal to the temperature of the front surface of the molten resin mass before introducing the pressurized fluid into the molten resin mass, no sink mark occurs in either the front surface or the back surface of the molten resin mass. When the temperature of the at least one preselected portion of the back surface of the molten resin mass is adjusted to a level lower than the temperature of the front surface of the molten resin mass, the back surface of the molten resin mass has a high cooling rate, so that the formation of a skin layer on the back surface of the molten resin mass rapidly advances, as compared to the skin layer formation on the front surface of the molten resin mass. As a result, a sink mark occurs in the back surface of the molten resin mass in preference to the front surface of the molten resin.

Accordingly, even if a pressurized fluid is then introduced, so that the back surface having the sink mark is strongly pushed against the inner wall surface of the mold cavity by the action of the pressurized fluid to thereby produce a non-uniformity in gloss and luster on the back surface of the obtained shaped article, such a non-uniformity on the back surface has no detrimental influence on the surface appearance of the front surface of the shaped article.

In the embodiment of item 11 of the above-enumerated embodiments, a mold for use in the injection method described in item 3 above is provided. The mold comprises a fixed mold half and a movable mold half adapted to mate with the fixed mold half to thereby provide a cavity defined by an inner wall surface of the fixed mold half and an inner wall surface of the movable mold half. The cavity has opposite, first and second inner wall surfaces, which respectively correspond to a front surface and a back surface of a shaped, hollow resin article to be molded by the mold. At least one preselected portion of the second inner wall surface of the cavity has a heat insulating member and a heat conductive layer disposed on the heat insulating member on a side of the cavity, wherein the heat insulating member and the heat conductive layer are embedded in the at least one preselected portion of the second inner wall surface. The heat insulating member has a heat conductivity which is $1/10^4$ to $1/30$ of the heat conductivity of the material of each of the mold halves of the mold, whereas the heat conductive layer has a heat conductivity which is equal to or larger than the heat conductivity of the material of each of the mold halves of the mold. The distance between the first and second inner wall surfaces of the cavity is set to be 3.5 mm or less, preferably 3.5 to 0.5 mm, as measured at the at least one preselected portion of the second inner wall surface of the cavity when the fixed mold half is mated with the movable mold half.

The regulation of the temperature of at least one preselected portion of the back surface of the molten resin mass as mentioned in the embodiment of item 3 above can be readily conducted using a mold of the embodiment of item 11 above. One form of the mold is shown in FIG. 5.

Hereinbelow, explanation is made with respect to the mold of the embodiment of item 11 above.

Figure 5:
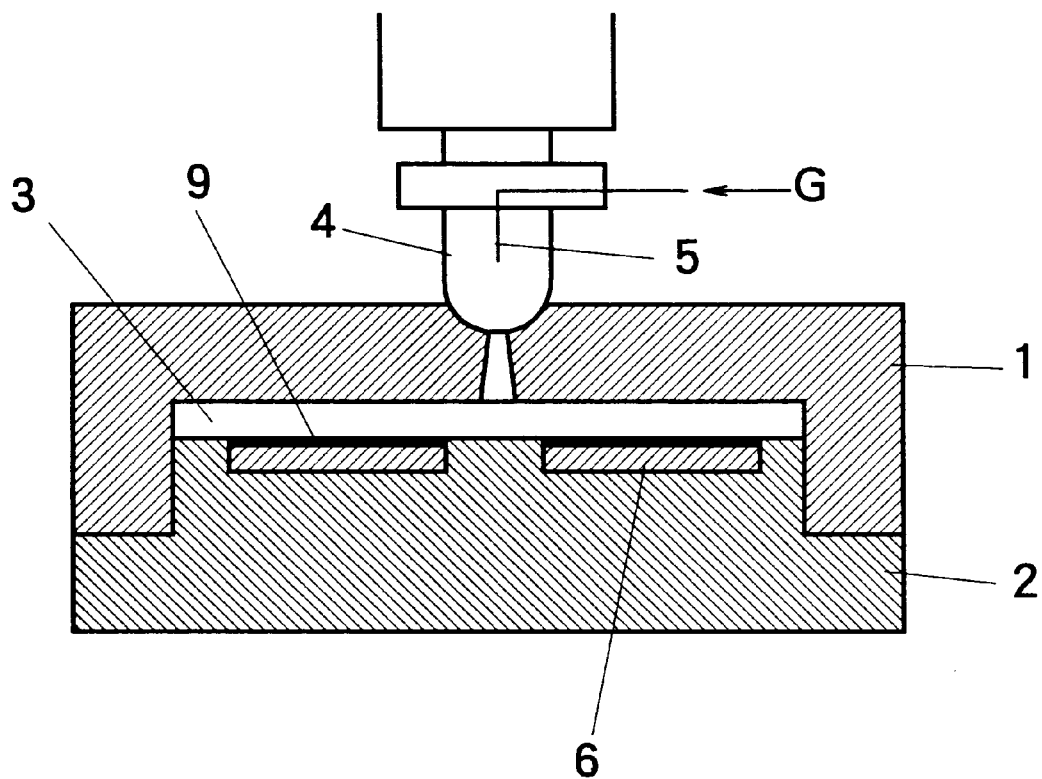
FIG. 5 is a diagrammatic, vertical cross-sectional view of one form of a mold having in combination a heat insulating member and a heat conductive layer, which can be used in another mode of the gas injection molding method according to the present invention, shown together with a molten resin injection nozzle and a pressurized fluid nozzle.

The mold shown in FIG. 5 (which is shown as one form of the mold of the embodiment of item 11 above) is the same as shown in FIGS. 1 and 2, except that the distance between the opposite, first and second inner wall surfaces of the mold cavity (formed by mating the movable mold half with the fixed mold half) is 3.5 mm or less as measured at a portion corresponding to the at least one preselected portion of the second inner wall surface of the cavity and that heat insulating member 6 embedded in the second inner wall surface of the cavity is covered with surface layer 9 (heat conductive layer).

Heat insulating member 6 used in the mold is the same as shown in FIGS. 1 and 2. It is necessary for heat insulating member 6 to have a heat conductivity which is $1/10^4$ to $1/30$ of the heat conductivity of the material of each of the mold halves of the mold. Preferably, heat insulating member 6 has a heat conductivity which is substantially $1/10^3$ to $1/10^2$ of the heat conductivity of the material of each of the mold halves of the mold.

Surface layer 9 (heat conductive layer) can be made of a material having a heat conductivity which is substantially equal to or larger than the heat conductivity of the material of each of the mold halves of the mold. However, it is preferable for surface layer 9 (heat conductive layer) to have a heat conductivity which is at least four times the heat conductivity of the material of each of the mold halves of the mold. Specific examples of materials for the surface layer include aluminum, nickel and copper. Surface layer 9 (heat conductive layer) has a thickness of preferably 0.001 to 10 mm, more preferably 0.1 to 5 mm, most preferably 0.5 to 2 mm.

In the injection molding method according to the present invention, when the mold has heat insulating member 6 covered with surface layer 9 (heat insulating member 6 is embedded in the second inner wall surface of the mold cavity which surface faces the back surface of the molten resin mass), the heat of the molten resin mass in the mold cavity is absorbed by surface layer 9 (which has a heat conductivity which is equal to or larger than the heat conductivity of the material of each of the mold halves of the mold) just after the injection of the molten resin, so that the surface of the molten resin mass at its portion contacting surface layer 9 is locally, rapidly cooled. In this case, however, since surface layer 9 is backed with heat insulating member 6, such rapid cooling of the molten resin mass is completed in a short time, and cooling of the molten resin mass at a portion thereof corresponding to heat insulating member 6 is moderated by the influence of heat insulating member 6.

In the embodiment of item 11 above as well, the location or morphology of a hollow to be formed in the shaped resin article is not limited to a radial form, and may be varied depending on the shape, size and intended use of the resultant shaped resin article. As mentioned in the embodiments of items 9 and 10 above, in this embodiment also, heat insulating member 6 (which is embedded in the second inner wall surface of the mold cavity which faces the back surface of the molten resin mass) can be embedded through such heat insulating layer 8 as mentioned above and, in addition, mold cavity 3 need not have a uniform thickness in an overall section thereof.

Figure 6:
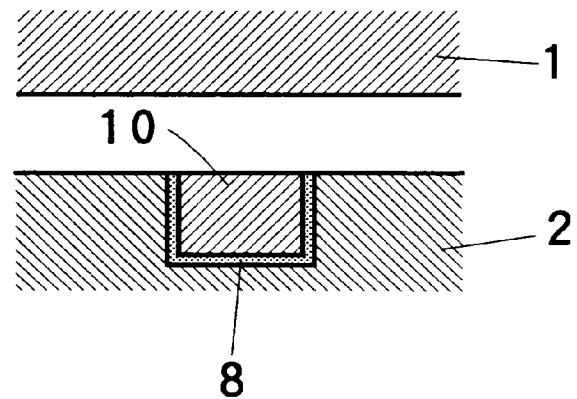
FIG. 6 is a diagrammatic, partly cut-away, vertical cross-sectional view of another form of the combination of a heat insulating member and a heat conductive layer, which can be used instead of the combination of the heat insulating member and heat conductive layer of the mold of FIG. 5.

In FIG. 5, heat insulating member 6 covered with a surface layer 9 is employed. However, as shown in FIG. 6, heat conductive member 10 of the same material as that of surface layer 9 can be embedded through heat insulating layer 8 (heat insulating member), so that the molten resin mass in the mold cavity can enjoy the same cooling effect as achieved by the use of heat insulating member 6 covered with surface layer 9. Heat insulating layer 8 can be the same as shown in FIG. 4. The heat of the molten resin mass in the mold cavity (which has heat insulating layer 8 and heat conductive layer 10) at a portion thereof corresponding to heat conductive layer 10 is rapidly absorbed by heat conductive layer 10 just after the injection of the molten resin, while the heat thus absorbed is prevented by the influence of heat insulating layer 8 from escaping from heat conductive member 10. Thus, heat conductive member 10 comes to a heat-storing state, so that, thereafter, cooling of the molten resin becomes moderate.

In addition, in the embodiment of item 11 above, when the occurrence of a sink mark is induced in the back surface of the molten resin mass (that is, each of surface layer 9 as a heat conductive layer and heat conductive member 11 has a heat conductivity which is larger than the material of each of the mold halves of the mold), it is desirable that the inner surface of the mold cavity (which corresponds to the back surface of the molten resin mass) have such a state that the molten resin mass can be easily released from the surface. For achieving such a state, for example, the inner surface of the mold cavity (corresponding to the back surface of the resultant shaped, hollow resin article) can be subjected to mirror finish processing, or a release agent such as paraffin can be applied to the inner surface of the mold cavity.

Further, for making it easy to adjust the temperature of the front surface of the molten resin mass to a level higher than the temperature of the back surface of the molten resin mass just after injecting the molten resin, the surface of the mold cavity corresponding to the front surface of the molten resin mass may be coated with a material having a heat conductivity which is smaller than the material of each of the mold halves of the mold. In this case, from the viewpoint of preventing the delay of cooling of the molten resin mass, it is preferred that the above-mentioned coating material have a heat conductivity within the same range as that of heat insulating member 6 and have a thickness of from 0.001 to 0.9 mm.

BEST MODE FOR CARRYING OUT THE INVENTION

The present invention will be described in more detail with reference to Examples, which should not be construed as limiting the scope of the present invention.

In the following Examples and Comparative Examples, pre-injection molding and gas injection molding were conducted using a full shot method (in which a molten resin is injected in an amount sufficient to fill the entire volume of the cavity) with respect to the shot volume of the molten resin.

In pre-injection molding, the time (a cooling time) between completion of the injection of a molten resin into a mold and opening the mold was 30 seconds.

In gas injection molding, the time between completion of the injection of a molten resin into a mold and opening of the mold was 30 seconds, and the time between completion of the injection of a molten resin into a mold and the starting of the introduction of a pressurized fluid (a pressurized gas was used in the Examples) into the molten resin mass was 1 second, the time between starting of the introduction of the pressurized fluid and completion of holding the pressurized fluid was 15 seconds, and the time between recovery of the pressurized fluid and opening of the mold was 14 seconds.

EXAMPLE 1

Figure 7:
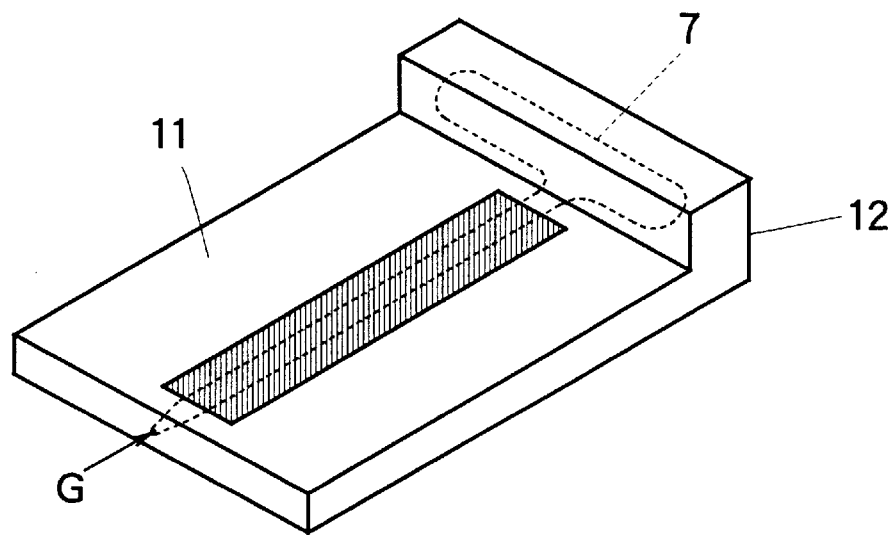
FIG. 7 is a diagrammatic, perspective view of a shaped, hollow resin article molded in Example 1.

A shaped resin article (as shown in FIG. 7), having plate section 11 of 3 mm in thickness which is provided at one end thereof with thick-walled section 12 of 5 mm in thickness, was produced using a mold made of carbon steel (JIS S55C)(having a heat conductivity of 50 W/mK at 300K). In a middle portion (extending as shown by hatching in FIG. 7) of an inner wall surface of the mold cavity which corresponds to a back surface of plate section 11 of the shaped resin article, a heat insulating member made of an epoxy resin (having a heat conductivity of 0.2 W/mK at 300K) and having a width of 10 mm and a thickness of 10 mm was embedded. The heat conductivity of the heat insulating member as measured at room temperature was 1/250 of that of the material of the mold.

(1) Pre-injection molding

Injection molding was conducted, without introducing a pressurized gas into a molten resin mass, using the above-mentioned mold. The injection molding was conducted under conditions wherein the resin used was a polystyrene resin (#400 manufactured and sold by Asahi Chemical Industry Co., Ltd., Japan), the plasticization temperature was 220° C. and the mold temperature was 45° C.

On a front surface of the obtained shaped resin article, no distinct sink mark was observed, although a slight sink mark occurred.

(2) Gas injection molding

Gas injection molding was conducted, using the above-mentioned mold, under conditions wherein the resin used was a polystyrene resin (#400 manufactured and sold by Asahi chemical Industry Co., Ltd., Japan), the molding temperature was 220° C., the mold temperature was 45° C. and the pressurized gas used was nitrogen gas (150 kg/cm$^2$).

The above-mentioned gas injection molding was conducted with a pair of pressure sensors (ISA444 manufactured and sold by Dynisco Co., Ltd., U.S.A.) respectively embedded in a middle portion of the surface of the heat insulating member (provided in the inner wall surface of the mold cavity as mentioned above) and in the other inner wall surface of the mold cavity on a side opposite to the inner wall surface having the heat insulating member therein, in order to examine the occurrence of any sink marks on the molten resin mass before introducing a pressurized gas. As a result, no lowering of pressure was detected by the pressure sensors and, thus, it was found that the molten resin mass did not undergo occurrence of a sink mark before the introduction of a pressurized gas.

The obtained shaped resin article had hollow 7 in plate section 11 and also in thick-walled section 12. In plate section 11, the hollow extends along a line corresponding to a line along which the heat insulating member extends. No occurrence of non-uniformity in the gloss and luster was observed on the front surface of the obtained shaped resin article, which front surface corresponds to the inner wall surface of the cavity on a side opposite to the inner wall surface having the heat insulating member embedded therein. In the obtained shaped resin article, as viewed in cross-section, hollow 7 was located in a biased position which is closer to the back surface of the hollow resin article which corresponds to the inner wall surface of the cavity having the heat insulating member embedded therein. Illustratively stated, the thickness between a front surface of the hollow resin article and hollow 7 was 1.38 mm, whereas the thickness between a back surface of the hollow resin article and hollow 7 was 0.72 mm.

EXAMPLE 2

Substantially the same procedure as in Example 1 was repeated, except that a hard glass was used as the heat insulating member. The heat conductivity of the heat insulating member as measured at room temperature was 1/40 of that of the material of the mold.

(1) Pre-injection molding

Injection molding was conducted, without introducing a pressurized gas into a molten resin mass, using the above-mentioned mold. The injection molding was conducted under the same conditions as in Example 1.

On a front surface of the obtained shaped resin article, no distinct sink mark was observed as in Example 1, although a slight sink mark occurred.

(2) Gas injection molding

Gas injection molding was conducted, using the above-mentioned mold, under substantially the same conditions as in Example 1, except that the pressure of the pressurized gas was 200 kg/cm$^2$.

The above-mentioned gas injection molding was conducted with a pair of pressure sensors embedded in substantially the same manner as in Example 1. As a result, no lowering of pressure was detected by the pressure sensors and, thus, it was found that the molten resin mass did not undergo occurrence of a sink mark before the introduction of a pressurized gas.

The obtained shaped resin article had hollow 7 in plate section 11 and also in thick-walled section 12. In plate section 11, the hollow extends along a line corresponding to a line along which the heat insulating member extends. However, the displacement of the location of the hollow in the obtained shaped resin article was large as compared to that in the shaped resin article obtained in Example 1. No occurrence of non-uniformity in the gloss and luster was observed on the front surface of the obtained shaped resin article, which front surface corresponds to the inner wall surface of the cavity on a side opposite to the inner wall surface having the heat insulating member embedded therein. In the obtained shaped resin article, as viewed in cross-section, hollow 7 was located in a biased position which is closer to the back surface of the hollow resin article which corresponds to the inner wall surface of the cavity having the heat insulating member embedded therein.

EXAMPLE 3

Substantially the same procedure as in Example 1 was repeated, except that aluminum (having a heat conductivity of 237 W/mk at 300 K) was used as the material of the mold. The heat conductivity of the heat insulating member as measured at room temperature was 1/1185 of that of the material of the mold.

(1) Pre-injection molding

Injection molding was conducted, without introducing a pressurized gas into a molten resin mass, using the above-mentioned mold. The injection molding was conducted under the same conditions as in Example 1.

On a front surface of the obtained shaped resin article, no distinct sink mark was observed as in Example 1, although a slight sink mark occurred.

(2) Gas injection molding

Gas injection molding was conducted, using the above-mentioned mold, under the same conditions as in Example 1.

The above-mentioned gas injection molding was conducted with a pair of pressure sensors embedded in substantially the same manner as in Example 1. As a result, no lowering of pressure was detected by the pressure sensors and, thus, it was found that the molten resin mass did not undergo occurrence of a sink mark before the introduction of a pressurized gas.

As in Example 1, the obtained shaped resin article had hollow 7 in plate section 11 and also in thick-walled section 12. In plate section 11, the hollow extends along a line corresponding to a line along which the heat insulating member extends. No occurrence of non-uniformity in the gloss and luster was observed on the front surface of the obtained shaped resin article, which front surface corresponds to the inner wall surface of the cavity on a side opposite to the inner wall surface having the heat insulating member embedded therein. In the obtained shaped resin article, as viewed in cross-section, hollow 7 was located in a biased position which is closer to the back surface of the hollow resin article which corresponds to the inner wall surface of the cavity having the heat insulating member embedded therein.

EXAMPLE 4

Substantially the same procedure as in Example 1 was repeated, except that the heat insulating member was made of carbon steel (JIS S55C) and a gap of about 20 $\mu$m was formed between the heat insulating member and the mold so as to provide a layer of air in the gap, which layer of air serves as a heat insulating layer.

(1) Pre-injection molding

Injection molding was conducted, without introducing a pressurized gas into a molten resin mass, using the above-mentioned mold. The injection molding was conducted under the same conditions as in Example 1.

On a front surface of the obtained shaped resin article, no distinct sink mark was observed as in Example 1, although a slight sink mark occurred.

(2) Gas injection molding

Gas injection molding was conducted, using the above-mentioned mold, under the same conditions as in Example 1.

The above-mentioned gas injection molding was conducted with a pair of pressure sensors embedded in substantially the same manner as in Example 1. As a result, no lowering of pressure was detected by the pressure sensors and, thus, it was found that the molten resin mass did not undergo occurrence of a sink mark before the introduction of a pressurized gas.

As in Example 1, the obtained shaped resin article had hollow 7 in plate section 11 and also in thick-walled section 12. In plate section 11, the hollow extends along a line corresponding to a line along which the heat insulating member extends. No occurrence of non-uniformity in the gloss and luster was observed on the front surface of the obtained shaped resin article, which front surface corresponds to the inner wall surface of the cavity on a side opposite to the inner wall surface having the heat insulating member embedded therein. In the obtained shaped resin article, as viewed in cross-section, hollow 7 was located in a biased position which is closer to the back surface of the hollow resin article which corresponds to the inner wall surface of the cavity having the heat insulating member embedded therein.

COMPARATIVE EXAMPLE 5

Substantially the same procedure as in Example 1 was repeated, except that the thickness of plate section 11 (as shown in FIG. 7) of the shaped resin article was changed to 2 mm.

(1) Pre-injection molding

Injection molding was conducted, without introducing a pressurized gas into a molten resin mass, using the above-mentioned mold. The injection molding was conducted under the same conditions as in Example 1.

A distinct sink mark was observed on a front surface of the obtained shaped resin article, which front surface corresponds to the inner wall surface of the cavity on a side opposite to the inner wall surface having the heat insulating member embedded therein.

(2) Gas injection molding

Gas injection molding was conducted, using the above-mentioned mold, under the same conditions as in Example 1.

The above-mentioned gas injection molding was conducted with a pair of pressure sensors embedded in substantially the same manner as in Example 1. As a result, a lowering of pressure was detected by the pressure sensors and, thus, it was found that the molten resin mass underwent occurrence of a slight sink mark before the introduction of a pressurized gas.

As in Example 1, the obtained shaped resin article had hollow 7 in plate section 11 and also in thick-walled section 12. In plate section 11, the hollow extends along a line corresponding to a line along which the heat insulating member extends. Occurrence of slight non-uniformity in the gloss and luster was observed on the front surface of the obtained shaped resin article, which front surface corresponds to the inner wall surface of the cavity on a side opposite to the inner wall surface having the heat insulating member embedded therein. In the obtained shaped resin article, as viewed in cross-section, hollow 7 was located in a biased position which is closer to the back surface of the hollow resin article which corresponds to the inner wall surface of the cavity having the heat insulating member embedded therein.

COMPARATIVE EXAMPLE 1

Substantially the same procedure as in Example 1 was repeated, except that aluminum was used as the material of the mold and carbon steel (JIS S55C) was used as the material of the heat insulating member. The heat conductivity of the heat insulating member as measured at room temperature was 1/4.74 of that of the material of the mold.

(1) Pre-injection molding

Injection molding was conducted, without introducing a pressurized gas into a molten resin mass, using the above-mentioned mold. The injection molding was conducted under the same conditions as in Example 1.

On a front surface of the obtained shaped resin article, no distinct sink mark was observed as in Example 1, although a slight sink mark occurred.

(2) Gas injection molding

Gas injection molding was conducted, using the above-mentioned mold, under the same conditions as in Example 1.

The above-mentioned gas injection molding was conducted with a pair of pressure sensors embedded in substantially the same manner as in Example 1. As a result, no lowering of pressure was detected by the pressure sensors and, thus, it was found that the molten resin mass did not undergo occurrence of a sink mark before the introduction of a pressurized gas.

It was also found that the location of a hollow in the obtained shaped resin article was largely deviated from the location of the heat insulating member and that the formation of the hollow was not satisfactory because the flow of the pressurized gas could not be led to an intended portion in the molten resin mass, which portion was remote from the portion of the molten resin mass from which the gas was introduced. Further, occurrence of non-uniformity in gloss and luster was observed in the front surface of the obtained shaped article at its portion which corresponds to the hollow formed therein. In the obtained shaped resin article, as viewed in cross-section, the hollow was located at a middle region of the thickness of the shaped resin article. Illustratively stated, the thickness between a front surface of the hollow resin article and the hollow was 1.05 mm, whereas the thickness between a back surface of the hollow resin article and the hollow was 1.09 mm.

EXAMPLE 6

Figure 8:
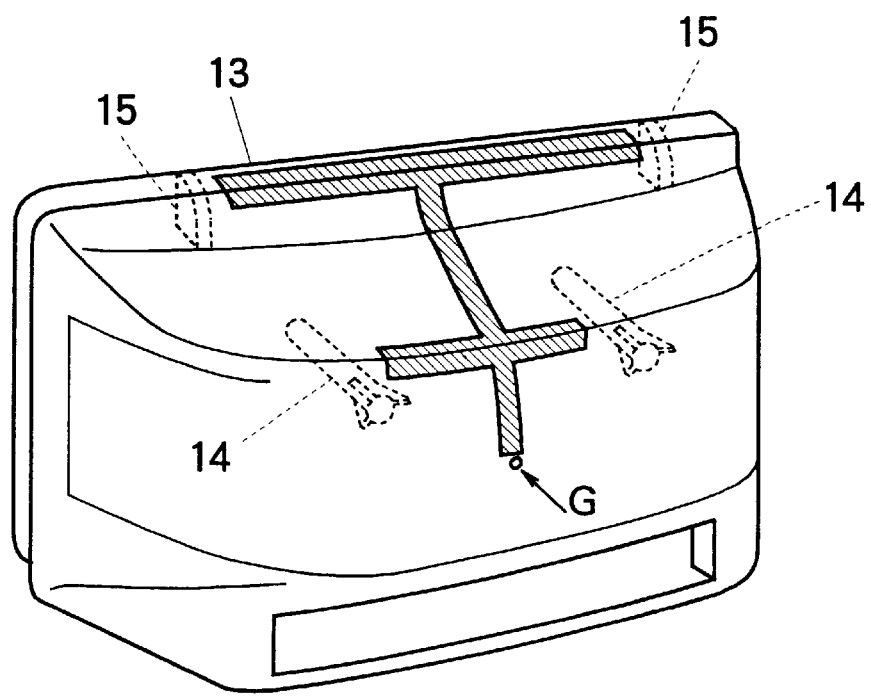
FIG. 8 is a diagrammatic, perspective view of a rear cover for a television set, which is molded in Example 6.

A rear cover for a television set as shown in FIG. 8 was molded. The rear cover has opening edge 13 on a front side of a television set (corresponding to a back side as viewed in FIG. 8). Opening edge 13 is thick-walled (maximum wall thickness is 5 mm) and provided at two portions thereof with reinforcing ribs 15, 15. Portions of the rear cover other than opening edge 13 and ribs 15, 15 have a wall thickness of about 3 mm. The mold used has a heat insulating member which is made of an epoxy resin and has a width of 5 mm and a thickness of 10 mm. The heat insulating member is embedded in a portion (as indicated by hatching in FIG. 8) of an inner wall surface of the mold cavity (corresponding to a back surface of the shaped resin article) so that a pressurized gas introduced into a molten resin mass from a central portion of a front surface of the molten resin mass can be surely led to opening edge 13 on a front side of a television set and to a base portion of boss 14, 14 (thick-walled section) provided on a back surface of the rear cover so as to protrude inwardly thereof. Carbon steel (JIS S55C) was used as the material of the mold. The heat conductivity of the heat insulting member as measured at room temperature was 1/250 of that of the material of the mold.

The gas injection molding was conducted under conditions wherein the resin used was a polystyrene resin (VS40 manufactured and sold by Asahi Chemical Industry), the molding temperature was 220° C., the mold temperature was 45° C. and the pressurized gas used was nitrogen gas (150 kg/cm$^2$).

The obtained rear cover had a hollow extending along a line corresponding to a line along which the heat insulating member extends. A hollow was also formed in opening edge 13 and a base portion of each of bosses 14, 14. No occurrence of non-uniformity in the gloss and luster was observed on the front surface of the obtained shaped resin article, which front surface corresponds to the inner wall surface of the cavity on a side opposite to the inner wall surface having the heat insulating member embedded therein. In the obtained shaped resin article, as viewed in crosssection, the hollow was located in a biased position which is closer to the back surface of the hollow resin article which corresponds to the inner wall surface of the cavity having the heat insulating member embedded therein.

EXAMPLE 7

A shaped resin article (as shown in FIG. 7), having plate section 11 of 2 mm in thickness which is provided at one end thereof with thick-walled section 12, was produced using a mold made of carbon steel (JIS S55C). In a middle portion (extending as shown by hatching in FIG. 7) of an inner wall surface of the mold cavity which corresponds to a back surface of plate section 11 of the shaped resin article, a heat insulating member made of an epoxy resin and having a width of 10 mm and a thickness of 10 mm was embedded. The heat insulating member is provided with a surface layer (heat conductive layer) made of carbon steel (JIS S55C) and having a thickness of 1 mm. The heat conductivity of the surface layer as measured at room temperature was equal to that of the material of the mold.

(1) Injection molding before gas introduction

Injection molding was conducted, without introducing a pressurized gas into a molten resin mass, using the above-mentioned mold. The injection molding was conducted under conditions wherein the resin used was a polystyrene resin (#400 manufactured and sold by Asahi Chemical Industry Co., Ltd., Japan), the plasticization temperature was 220° C. and the mold temperature was 45° C.

A distinct sink mark was observed on the back surface of the obtained shaped resin article, which back surface corresponds to the inner wall surface of the cavity having the heat insulating member therein.

(2) Gas injection molding

Gas injection molding was conducted, using the above-mentioned mold, under conditions wherein the resin used was a polystyrene resin (#400 manufactured and sold by Asahi Chemical Industry Co., Ltd., Japan), the molding temperature was 220° C., the mold temperature was 45° C. and the pressurized gas used was nitrogen gas (190 kg/cm$^2$).

The obtained shaped resin article had hollow 7 in plate section 11 and also in thick-walled section 12. In plate section 11, the hollow extends along a line corresponding to a line along which the heat insulating member extends. No occurrence of non-uniformity in the gloss and luster was observed on the front surface of the obtained shaped resin article, which front surface corresponds to the inner wall surface of the cavity on a side opposite to the inner wall surface having the heat insulating member therein. In the obtained shaped resin article, as viewed in cross-section, hollow 7 was located substantially in the middle of the thickness of the shaped article.

EXAMPLE 8

Substantially the same procedure as in Example 7 was repeated, except that an epoxy resin was used as the heat insulating member and the surface layer was a thin plate made of aluminum and having a thickness of 0.1 mm. The heat conductivity of the surface layer as measured at room temperature was 4.74 of that of the material of the mold.

(1) Injection molding before gas introduction

Injection molding was conducted, without introducing a pressurized gas into a molten resin mass, using the above-mentioned mold. The injection molding was conducted under the same conditions as in Example 7.

A distinct sink mark was observed, as in Example 7, on a back surface of the obtained shaped resin article, which back surface corresponds to the inner wall surface of the cavity having the heat insulating member therein.

(2) Gas injection molding

Gas injection molding was conducted, using the above-mentioned mold, under the same conditions as in Example 7.

As in Example 7, the obtained shaped resin article had a hollow in the plate section and also in the thick-walled section. In the plate section, the hollow extends along a line corresponding to a line along which the heat insulating member extends. No occurrence of non-uniformity in the gloss and luster was observed on the front surface of the obtained shaped resin article, which front surface corresponds to the inner wall surface of the cavity on a side opposite to the inner wall surface having the heat insulating member therein. In the obtained shaped resin article, as viewed in cross-section, the hollow was located at a middle region of the thickness of the shaped resin article.

EXAMPLE 9

Substantially the same procedure as in Example 7 was repeated, except that the surface layer provided on the heat insulating member was formed integrally with the material of the mold. The heat conductivity of the surface layer as measured at room temperature was equal to that of the material of the mold.

(1) Injection molding before gas introduction

Injection molding was conducted, without introducing a pressurized gas into a molten resin mass, using the above-mentioned mold. The injection molding was conducted under the same conditions as in Example 7.

As in Example 7, a distinct sink mark was observed, on a back surface of the obtained shaped resin article, which back surface corresponds to the inner wall surface of the cavity having the heat insulating member therein.

(2) Gas injection molding

Gas injection molding was conducted, using the above-mentioned mold, under the same conditions as in Example 7.

As in Example 7, the obtained shaped resin article had a hollow in the plate section and also in the thick-walled section. In the plate section, the hollow extends along a line corresponding to a line along which the heat insulating member extends. No occurrence of non-uniformity in gloss and luster was observed on the front surface of the obtained shaped resin article, which front surface corresponds to the inner wall surface of the cavity on a side opposite to the inner wall surface having the heat insulating member therein. In the obtained shaped resin article, as viewed in cross-section, the hollow was located at a middle region of the thickness of the shaped resin article.

EXAMPLE 10

Substantially the same procedure as in Example 7 was repeated, except that an epoxy resin was used as the heat insulating member and the surface layer was a deposited layer made of nickel and having a thickness of 0.1 mm. The heat conductivity of the surface layer as measured at room temperature was 1.8 of that of the material of the mold.

(1) Injection molding before gas introduction

Injection molding was conducted, without introducing a pressurized gas into a molten resin mass, using the above-mentioned mold. The injection molding was conducted under the same conditions as in Example 7.

As in Example 7, a distinct sink mark was observed, on a back surface of the obtained shaped resin article, which back surface corresponds to the inner wall surface of the cavity having the heat insulating member therein.

(2) Gas injection molding

Gas injection molding was conducted, using the above-mentioned mold, under the same conditions as in Example 10.

As in Example 7, the obtained shaped resin article had a hollow in the plate section and also in the thick-walled section. In the plate section, the hollow extends along a line corresponding to a line along which the heat insulating member extends. No occurrence of non-uniformity in gloss and luster was observed on the front surface of the obtained shaped resin article, which front surface corresponds to the inner wall surface of the cavity on a side opposite to the inner wall surface having the heat insulating member therein. In the obtained shaped resin article, as viewed in cross-section, the hollow was located at a middle region of the thickness of the shaped resin article.

EXAMPLE 11

Substantially the same procedure as in Example 7 was repeated, except that the surface layer is changed to a copper plate having a thickness of 5 mm and that a space is formed between the surface layer and the mold cavity (the distance between the surface of the surface layer and the mold cavity is 5 mm) to provide an air layer, wherein the above-mentioned air layer serves as a heat insulating member and wherein an epoxy resin heat insulating member is not used.

(1) Injection molding before gas introduction

Injection molding was conducted, without introducing a pressurized gas into a molten resin mass, using the above-mentioned mold. The injection molding was conducted under the same conditions as in Example 7.

As in Example 7, a distinct sink mark was observed, on a back surface of the obtained shaped resin article, which back surface corresponds to the inner wall surface of the cavity having the heat insulating member therein.

(2) Gas injection molding

Gas injection molding was conducted, using the above-mentioned mold, under the same conditions as in Example 7.

As in Example 7, the obtained shaped resin article had a hollow in the plate section and also in the thick-walled section. In the plate section, the hollow extends along a line corresponding to a line along which the heat insulating member extends. No occurrence of non-uniformity in gloss and luster was observed on the front surface of the obtained shaped resin article, which front surface corresponds to the inner wall surface of the cavity on a side opposite to the inner wall surface having the heat insulating member therein. In the obtained shaped resin article, as viewed in cross-section, the hollow was located at a middle region of the thickness of the shaped resin article.

EXAMPLE 12

Substantially the same procedure as in Example 7 was repeated, except that a heat insulating member without a surface layer was embedded in a middle portion (extending as shown by hatching in FIG. 7) of an inner wall surface of the mold cavity which corresponds to a back surface of plate section 11 of the shaped resin article.

(1) Injection molding before gas introduction

Injection molding was conducted, without introducing a pressurized gas into a molten resin mass, using the above-mentioned mold. The injection molding was conducted under the same conditions as in Example 7.

A distinct sink mark was observed on a front surface of the obtained shaped resin article, which front surface corresponds to the inner wall surface of the cavity on a side opposite to the inner wall surface having the heat insulating member therein.

(2) Gas injection molding

Gas injection molding was conducted, using the above-mentioned mold, under the same conditions as in Example 7.

The obtained shaped resin article had hollow 7 in plate section 11 and also in thick-walled section 12. In plate section 11, the hollow extends along a line corresponding to a line along which the heat insulating member extends. Occurrence of slight non-uniformity in the gloss and luster was observed on the front surface of the obtained shaped resin article, which front surface corresponds to the inner wall surface of the cavity on a side opposite to the inner wall surface having the heat insulating member therein. In the obtained shaped resin article, as viewed in cross-section, the hollow was located in a biased position which is closer to the back surface of the hollow resin article which corresponds to the inner wall surface of the cavity having the heat insulating member embedded therein.

EXAMPLE 13

Substantially the same procedure as in Example 7 was repeated, except that a stainless steel (JIS SUS 304) having a heat conductivity of 17 W/mK at 300 K) was used as the surface layer. The heat conductivity of the heat insulating member as measured at room temperature was 1/2.94 of that of the material of the mold.

(1) Injection molding before gas introduction

Injection molding was conducted, without introducing a pressurized gas into a molten resin mass, using the above-mentioned mold. The injection molding was conducted under the same conditions as in Example 7.

A distinct sink mark was observed on a front surface of the obtained shaped resin article, which front surface corresponds to the inner wall surface of the cavity on a side opposite to the inner wall surface having the heat insulating member therein.

(2) Gas injection molding

Gas injection molding was conducted, using the above-mentioned mold, under the same conditions as in Example 7.

The obtained shaped resin article had hollow 7 in plate section 11 and also in thick-walled section 12. In plate section 11, the hollow extends along a line corresponding to a line along which the heat insulating member extends. Occurrence of slight non-uniformity in the gloss and luster was observed on the front surface of the obtained shaped resin article, which front surface corresponds to the inner wall surface of the cavity on a side opposite to the inner wall surface having the heat insulating member therein. In the obtained shaped resin article, as viewed in cross-section, hollow 7 was located substantially in the middle of the thickness of the shaped article.

EXAMPLE 14

Figure 9:
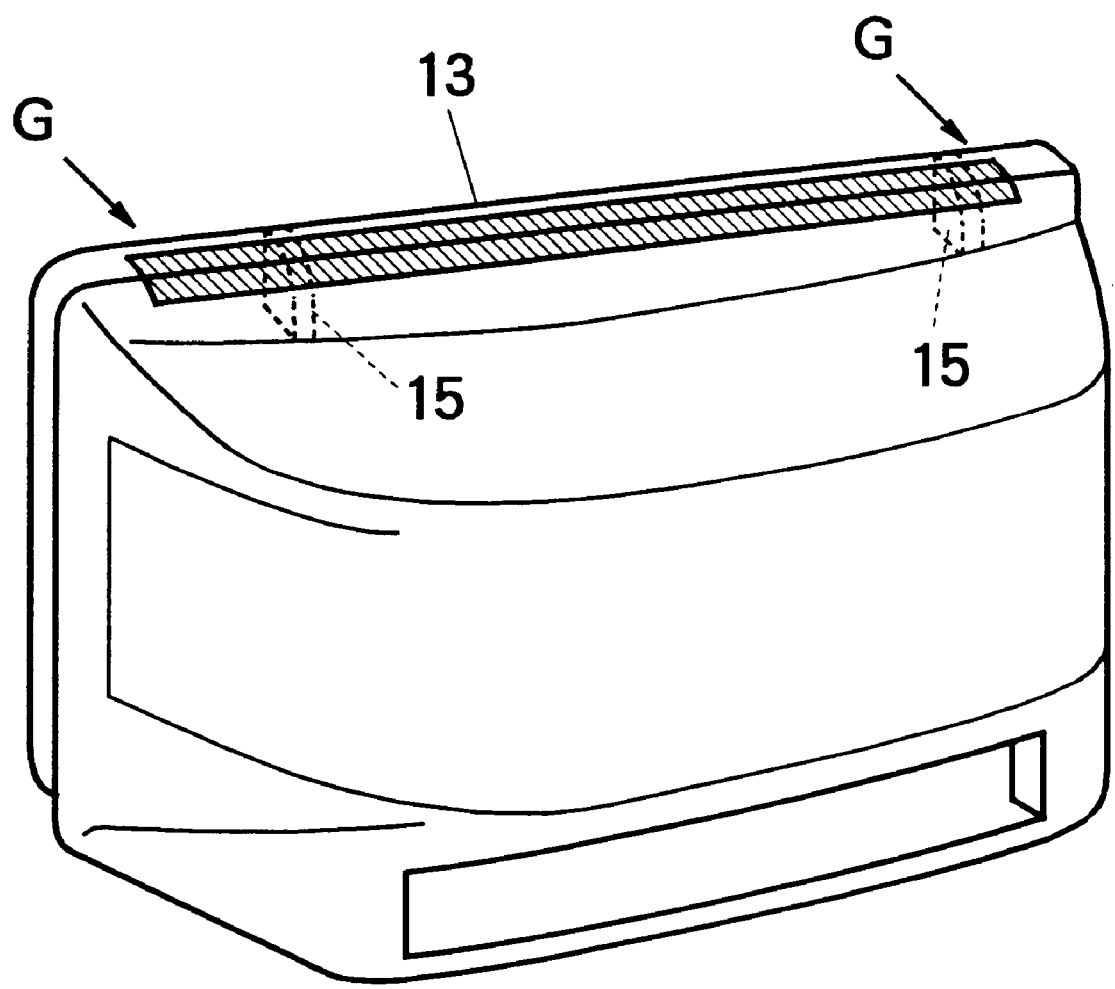
FIG. 9 is a diagrammatic, perspective view of a rear cover for a television set, which is molded in Example 14.

A rear cover for a television set as shown in FIG. 9 was molded. The rear cover has opening edge 13 on the front side of the television set (corresponding to the back side as viewed in FIG. 9). Opening edge 13 is provided at two portions thereof with reinforcing ribs 15, 15.

The wall thickness of the rear cover (including the wall thickness of opening edge 13) is about 2 mm. The mold used has a heat insulating member (which is made of an epoxy resin and has a width of 10 mm and a thickness of 10 mm) having thereon a surface layer which is made of carbon steel (JIS S55C) and has a thickness of 1 mm. The heat insulating member is embedded in a portion (as indicated by hatching in FIG. 9) of an inner wall surface of the mold cavity (corresponding to a back surface of the shaped resin article) so that a pressurized gas introduced into a molten resin mass from a side of opening edge 13 of the molten resin mass can be surely led to a base portion of ribs 15, 15. Carbon steel (JIS S55C) was used as the material of the mold. The heat conductivity of the heat insulating member as measured at room temperature was equal to that of the material of the mold.

The gas injection molding was conducted under conditions wherein the resin used was a polystyrene resin (VS40 manufactured and sold by Asahi Chemical Industry), the molding temperature was 220° C., the mold temperature was 45° C. and the pressurized gas used was nitrogen gas (150 kg/cm$^2$).

The obtained rear cover had a hollow extending along a line corresponding to a line along which the heat insulating member extends. A hollow was also formed in reinforcing ribs 15, 15. No occurrence of non-uniformity in the gloss and luster was observed on the front surface of the obtained shaped resin article, which front surface corresponds to the inner wall surface of the cavity on a side opposite to the inner wall surface having the heat insulating member embedded therein. In the obtained shaped resin article, as viewed in cross-section, the hollow was located at a middle region of the thickness of the shaped resin article.

INDUSTRIAL APPLICABILITY

As discussed above, according to the method of the present invention, the flow of the pressurized fluid introduced can be surely led to an intended portion in a molten resin mass, so that the location of a hollow in the molten resin mass can be surely controlled. Further, in the preferred embodiments of the present invention, not only can the location of the hollow to be formed in the shaped article be precisely controlled, but also a high quality shaped article having a good surface condition can be obtained.

We claim:

1. A method for injection molding a resin while forming a hollow to produce a shaped, hollow resin article having a thickness of at least 1.0 mm, comprising:

(1) providing a mold comprising a fixed mold half and a movable mold half mating with said fixed mold half to thereby provide a cavity defined by an inner wall surface of the fixed mold half and an inner wall surface of the movable mold half, said cavity having opposite, first and second inner wall surfaces, which respectively correspond to a front surface and a back surface of a shaped, hollow resin article to be molded by said mold;

(2) injecting a resin in a molten form into said cavity through a gate for the cavity in an amount of at least 60% of a predetermined amount sufficient to fill the entire volume of the cavity, thereby forming a molten resin mass having opposite, front and back surfaces respectively facing the opposite, first and second inner wall surfaces of said cavity;

(3) introducing a pressurized fluid into the molten resin mass through said gate or through an inlet for said fluid which inlet is provided independently from said gate, thereby forming a hollow in said molten resin mass, wherein the introduction of said fluid is conducted without injecting a molten resin into the cavity or while injecting a molten resin into the cavity; and (4) allowing the molten resin mass having the hollow formed therein to cool, thereby producing a shaped, hollow resin article;

wherein at least one preselected discrete portion of said second inner wall surface of the cavity has a heat insulating member embedded therein, said heat insulating member having a heat conductivity which is 1/10$^4$ to 1/30 of the heat conductivity of the material constituting the remainder of said inner wall surfaces of the cavity, thereby causing said fluid to flow into said molten resin mass along a line substantially corresponding to a line along which said preselected portion of said second inner wall surface of the cavity extends, so that the shaped, hollow resin article produced has a hollow in a position corresponding to said preselected portion of said second inner wall surface of the cavity.

2. The method according to claim 1, wherein said heat insulating member has its one surface exposed to said cavity.

3. The method according to claim 1, wherein said preselected portion of said second inner wall surface of the cavity has a heat conductive layer disposed on said heat insulating member on a side of the cavity, said heat insulating member and said heat conductive layer being embedded in said preselected portion of the second inner wall surface.

4. An apparatus for injection molding a resin while forming a hollow to produce a shaped, hollow resin article, which apparatus comprises:

a fixed mold half and a movable mold half adapted to mate with said fixed mold half to thereby provide a cavity defined by an inner wall surface of the fixed mold half and an inner wall surface of the movable mold half, said cavity having opposite, first and second inner wall surfaces, which respectively correspond to a front surface and a back surface of a shaped, hollow resin article to be molded by said mold;

wherein at least one preselected discrete portion of said second inner wall surface of the cavity has a heat insulating member embedded therein, said heat insulating member having a heat conductivity which is 1/10$^4$ to 1/30 of the heat conductivity of the material constituting the remainder of said inner wall surfaces of the cavity;

means for injecting a resin in a molten form into said mold;

means for introducing a pressurized fluid into the resin upon completion of said injection; and thereby causing said fluid to flow into said molten resin mass along a line substantially corresponding to a line along which said preselected portion of said second inner wall surface of the cavity extends, so that the shaped, hollow resin article produced has a hollow in a position corresponding to said preselected portion of said second inner wall surface of the cavity.

5. The apparatus according to claim 4, wherein said heat insulating member has its one surface exposed to said cavity.

6. The apparatus according to claim 4, wherein said preselected discrete portion of said second inner wall surface of the cavity has a heat conductive layer disposed on said heat insulating member on a side of the cavity, said heat insulating member and said heat conductive layer being embedded in said preselected portion of the second inner wall surface, and said heat conductive layer has a heat conductivity which is equal to or larger than the heat conductivity of the material constituting the remainder of said inner wall surfaces of the cavity.

* * * * *